United States Patent
Suumäki

(10) Patent No.: US 9,288,228 B2
(45) Date of Patent: Mar. 15, 2016

(54) METHOD, APPARATUS, AND COMPUTER PROGRAM PRODUCT FOR CONNECTION SETUP IN DEVICE-TO-DEVICE COMMUNICATION

(75) Inventor: Jan Suumäki, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 806 days.

(21) Appl. No.: 13/198,984

(22) Filed: Aug. 5, 2011

(65) Prior Publication Data

US 2013/0036231 A1    Feb. 7, 2013

(51) Int. Cl.
*H04L 29/06* (2006.01)
*H04W 12/04* (2009.01)
*H04W 12/06* (2009.01)
*H04W 84/12* (2009.01)

(52) U.S. Cl.
CPC .............. *H04L 63/18* (2013.01); *H04W 12/04* (2013.01); *H04W 12/06* (2013.01); *H04W 84/12* (2013.01)

(58) Field of Classification Search
USPC .......................................... 380/270, 277–279
See application file for complete search history.

(56) References Cited

U.S. PATENT DOCUMENTS

| | | | |
|---|---|---|---|
| 5,530,702 A | 6/1996 | Palmer et al. | |
| 5,842,210 A | 11/1998 | Chen et al. | |
| 6,757,531 B1 | 6/2004 | Haaramo et al. | |
| 6,816,063 B2 | 11/2004 | Kubler et al. | |
| 6,888,354 B1 | 5/2005 | Gofman | |
| 6,892,052 B2 | 5/2005 | Kotola et al. | |
| 7,069,312 B2 | 6/2006 | Kostic et al. | |
| 7,075,412 B1 | 7/2006 | Reynolds et al. | |
| 7,190,981 B2 | 3/2007 | Cherian | |
| 7,471,200 B2 | 12/2008 | Otranen | |
| 7,519,682 B2 | 4/2009 | Smith et al. | |
| 7,701,958 B2 | 4/2010 | Abrol et al. | |
| 7,775,432 B2 | 8/2010 | Jalkanen et al. | |

(Continued)

FOREIGN PATENT DOCUMENTS

| | | |
|---|---|---|
| EP | 1630712 | 1/2006 |
| EP | 1633104 | 8/2006 |

(Continued)

OTHER PUBLICATIONS

European Search Report for EP Application No. 08006467.8-2412 / 1965555 dated Nov. 2, 2011.

(Continued)

*Primary Examiner* — Beemnet Dada
(74) *Attorney, Agent, or Firm* — Locke Lord LLP

(57) ABSTRACT

Example method, apparatus, and computer program product embodiments are disclosed to enable out-of-band short-range communication carrier transport switching for connection setup in device-to-device communication. example embodiments of the invention include a method comprising the steps of participating, by a first device, in a wireless network managed by at least one of an access point device or a group owner device; and exchanging, by the first device, information with a second device over a wireless out-of-band short-range carrier, the exchanged information comprising in-band communication connection parameters for enabling the second device to join the wireless network and authentication information recognizable by the at least one of an access point device or a group owner device managing the wireless network.

18 Claims, 35 Drawing Sheets

(56) References Cited

U.S. PATENT DOCUMENTS

| | | | |
|---|---|---|---|
| 7,821,399 B2 | 10/2010 | Otranen | |
| 7,899,187 B2* | 3/2011 | Messerges et al. | 380/279 |
| 7,974,606 B2* | 7/2011 | Lo et al. | 455/411 |
| 8,210,433 B2 | 7/2012 | Jalkanen et al. | |
| 2001/0045460 A1 | 11/2001 | Reynolds et al. | |
| 2002/0012329 A1 | 1/2002 | Atkinson et al. | |
| 2002/0021809 A1 | 2/2002 | Salo et al. | |
| 2002/0022961 A1 | 2/2002 | Sepanaho | |
| 2002/0023264 A1 | 2/2002 | Aaltonen et al. | |
| 2002/0069406 A1 | 6/2002 | Aaltonen et al. | |
| 2002/0087997 A1 | 7/2002 | Dahlstrom | |
| 2002/0191998 A1 | 12/2002 | Cremon et al. | |
| 2003/0043041 A1 | 3/2003 | Zeps et al. | |
| 2003/0084177 A1 | 5/2003 | Mulligan | |
| 2003/0097304 A1 | 5/2003 | Hunt | |
| 2003/0120745 A1 | 6/2003 | Katagishi et al. | |
| 2003/0134653 A1 | 7/2003 | Sarkkinen et al. | |
| 2004/0103312 A1 | 5/2004 | Messerges et al. | |
| 2004/0193676 A1 | 9/2004 | Marks | |
| 2004/0203413 A1 | 10/2004 | Harumoto | |
| 2004/0225199 A1 | 11/2004 | Evanyk et al. | |
| 2006/0003768 A1 | 1/2006 | Chiou | |
| 2006/0251256 A1* | 11/2006 | Asokan et al. | 380/270 |
| 2007/0001853 A1 | 1/2007 | Otranen | |
| 2007/0123316 A1 | 5/2007 | Little | |
| 2007/0168440 A1 | 7/2007 | Cobelens | |
| 2008/0146151 A1 | 6/2008 | Lyu et al. | |
| 2008/0195788 A1 | 8/2008 | Tamir et al. | |
| 2008/0248751 A1 | 10/2008 | Pirzada et al. | |
| 2008/0253331 A1 | 10/2008 | Gupta et al. | |
| 2009/0197604 A1 | 8/2009 | Gupta et al. | |
| 2009/0222659 A1 | 9/2009 | Miyabayashi et al. | |
| 2009/0227282 A1 | 9/2009 | Miyabayashi et al. | |
| 2009/0264098 A1 | 10/2009 | Lo et al. | |
| 2009/0271519 A1 | 10/2009 | Helvick | |
| 2009/0276439 A1 | 11/2009 | Rosenblatt et al. | |
| 2010/0056123 A1 | 3/2010 | Julian et al. | |
| 2010/0057969 A1 | 3/2010 | Meiri et al. | |
| 2010/0197224 A1 | 8/2010 | Lahdenniemi et al. | |
| 2010/0211785 A1 | 8/2010 | Park et al. | |
| 2010/0260069 A1 | 10/2010 | Sakamoto et al. | |
| 2012/0057577 A1 | 3/2012 | Dwivedi et al. | |
| 2012/0155643 A1 | 6/2012 | Hassan et al. | |
| 2012/0169473 A1 | 7/2012 | Jalkanen et al. | |
| 2013/0016032 A1 | 1/2013 | Margulis | |

FOREIGN PATENT DOCUMENTS

| | | |
|---|---|---|
| WO | 00/67221 | 11/2000 |
| WO | 01/45319 A1 | 6/2001 |
| WO | 01/52179 A2 | 7/2001 |
| WO | 02/11074 A2 | 2/2002 |
| WO | 2006/106393 A2 | 10/2006 |
| WO | WO2006130063 | 12/2006 |
| WO | 2007/001629 A2 | 1/2007 |

OTHER PUBLICATIONS

European Search Report dated Jan. 27, 2012 for Application No. EP 11181733.4-2412.
NFC Forum Connection Handover Technical Specification NFC Forum TM Conection handover 1.1 NFCForum-TS-ConnectionHandover_1.1, Nov. 6, 2008, 43 pp.
Wi-Fi Peer-to-Peer (P2P) technical Specification, Wi-Fi Alliance Technical Committee P2P Task Group, Version 1.1, 2010 Wi-Fi Alliance, 159 pp.
"Wi-Fi CertifiedTM for Wi-Fi Protected SetupTM: Easing the User Experience for Home and Small Office Wi-FiR Networks", 2007, 2008, 2009, Wi-Fi Alliance, pp. 1-14.
Wi-Fi Simple Configuration Technical Specification, Version 2.0.0, 2010 Wi-Fi Alliance, 154 pp.
NFC Digital Protocol Candidate Technical Specification, NFC Forum TM, NFCForum-TS-Digital Protocol—Apr. 3, 2009.
NFC Activity Specification Candidate Technical Specification, NFC ForumTM, NFCForum-TS Activity-1.0_Candidate-1, Mar. 12, 2010.
NFC Forum; Logical Link Control Protocol; Technical Specification NFC Forum TM; LLCP 1.0; NFCForum-TS-LLCP 1.0: NFCForum-TS-LLCP_1.0; Dec. 11, 2009.
NFC Forum; NFC Data Exchange Format (NDEF) Technical Specification: NFC Forum TM; NDEF 1.0; NFCForum-TS-NDEF_1.0; Jul. 24, 2006.
WiFi Alliance; Wi-Fi Protected Setup Specification Version 1.0h; Dec. 2006.
WiFi Alliance; WiFi Configuration Specification Version 2.0 r42 unofficial draft-01; Feb. 9, 2010.
NFC Forum; Connection Handover; Technical Specification NFC Forum TM; Connection Handover 1.2; NFCForum-TS-ConnectionHandover_1_2.doc; dated Jul. 7, 2010.
International Search Report and Written Opinion mailed Oct. 19, 2012 for International Application Serial No. PCT/FI2012/050577, 14 pp.
Widmer, Peter, "Smart Box Software Framework," Vision Document, Jul. 4, 2003, 23pp.
J. Suomalainen et el., "Standards for Security Associations in Personal Networks: A Comparative Analysis", International Journal of Security and Networks, vol. 4, Nos. 1-2, 2009, pp. 87-100.
Wu, et al., "An Ubiquitous Data Delivery System in Hybrid Wireless Environments", Proceedings of the 2010 International Conference on P2P, Parallel, Grid, Cloud and Internet Computing, 2010, pp. 230-234.
International Search Report dated Jul. 20, 2011 for PCT International Application No. PCT/FI2011/050281.
Radio Frequency Identification RFID—A basic primer; AIM Inc. White Paper; Aug. 23, 2001, the Association of the Automatic Identification and Data Capture Industry (AIM Inc.); WP-98/002R2, 17 pp.
Notice and Filing of Opposition in European Patent 1 685 689, 11 pp.
Reply to Notice of Opposition in European Patent 1 685 689, 11 pp.
Office Action for Korean Application No. 10-2006-7009441 dated Apr. 23, 2007.
Notice of Allowance for Korean Application No. 10-2006-7009441 dated Jan. 7, 2008.
Extended European Search Report for Application No. 12821728.8-1853 dated Mar. 25, 2015.

* cited by examiner

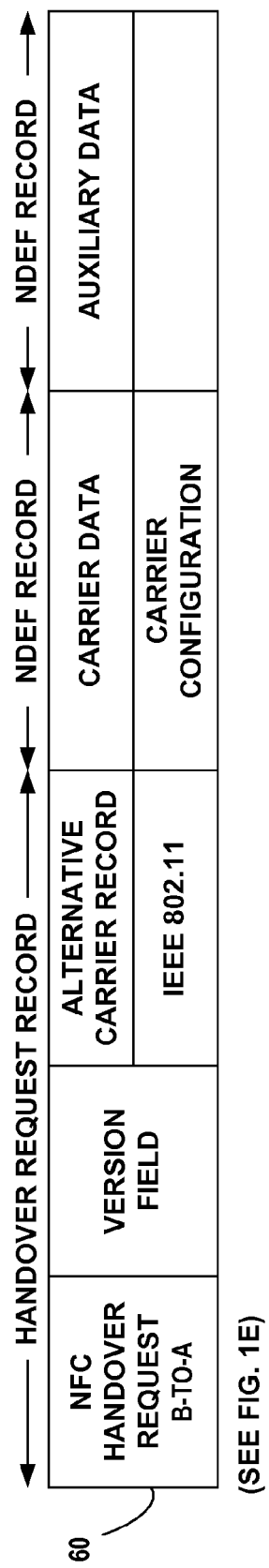
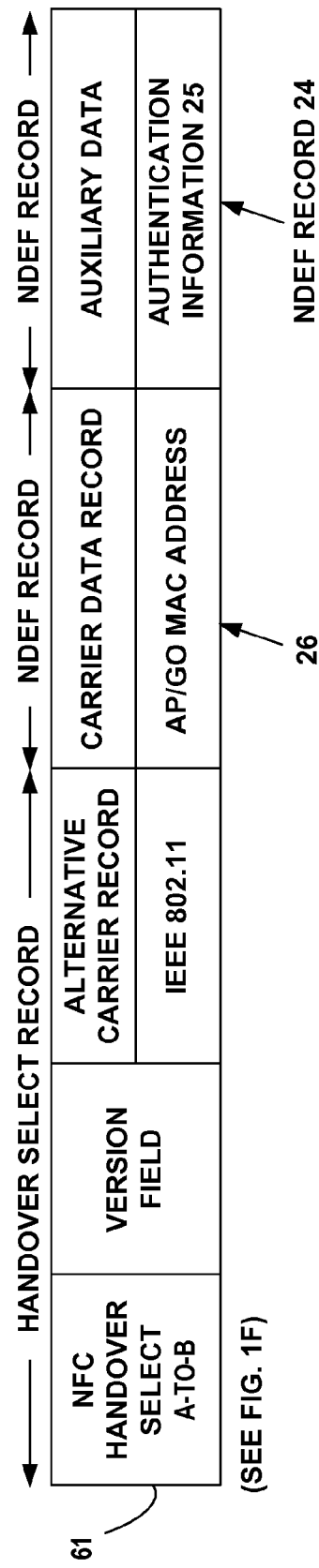

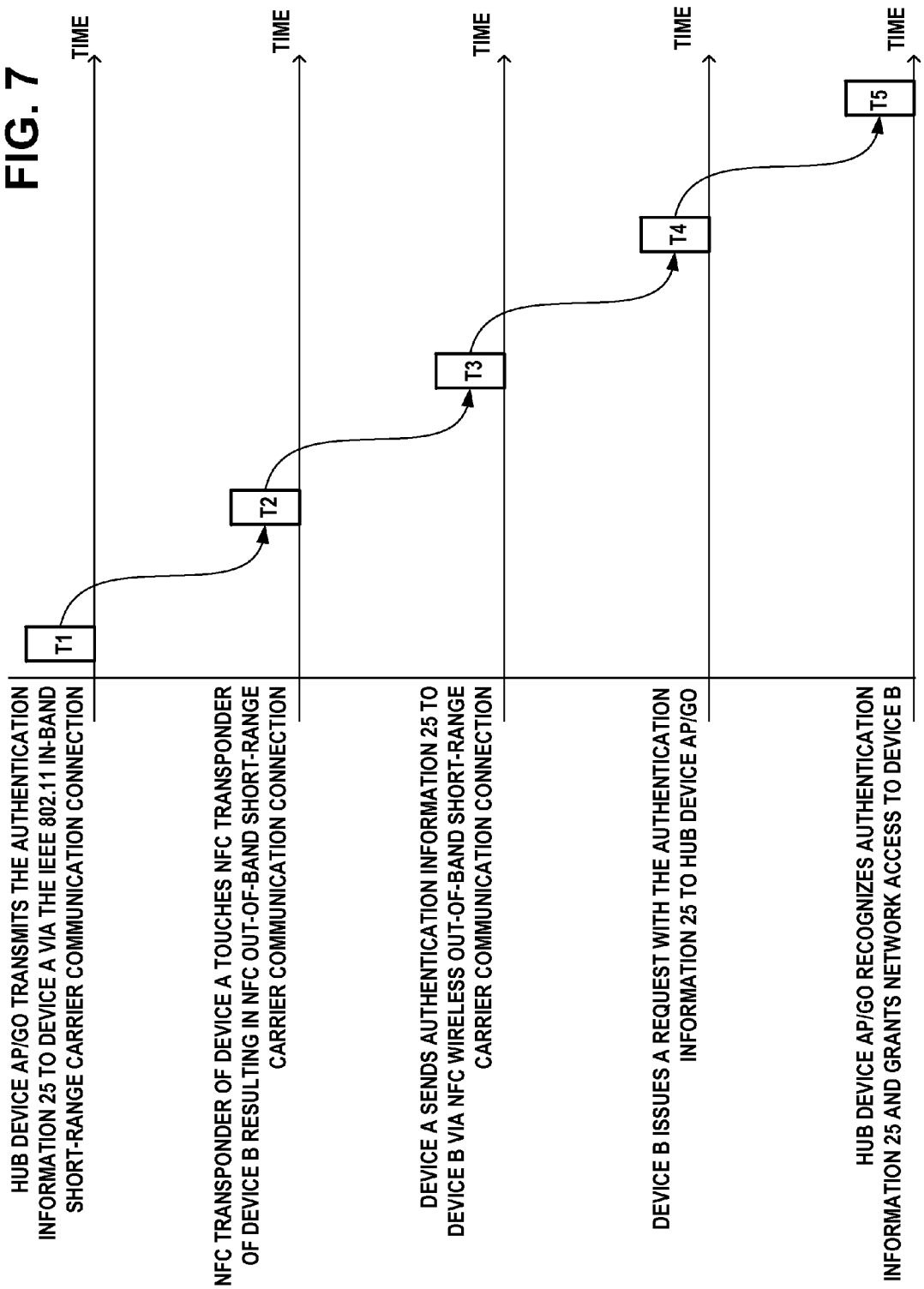

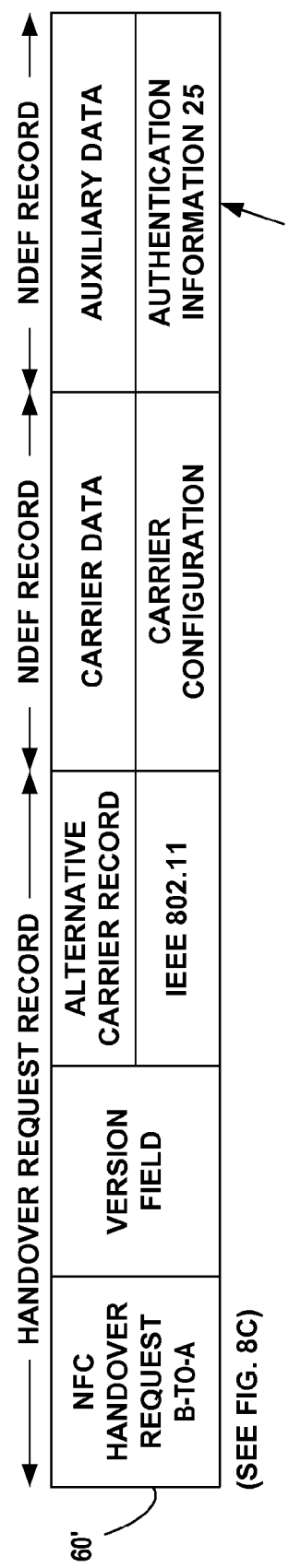
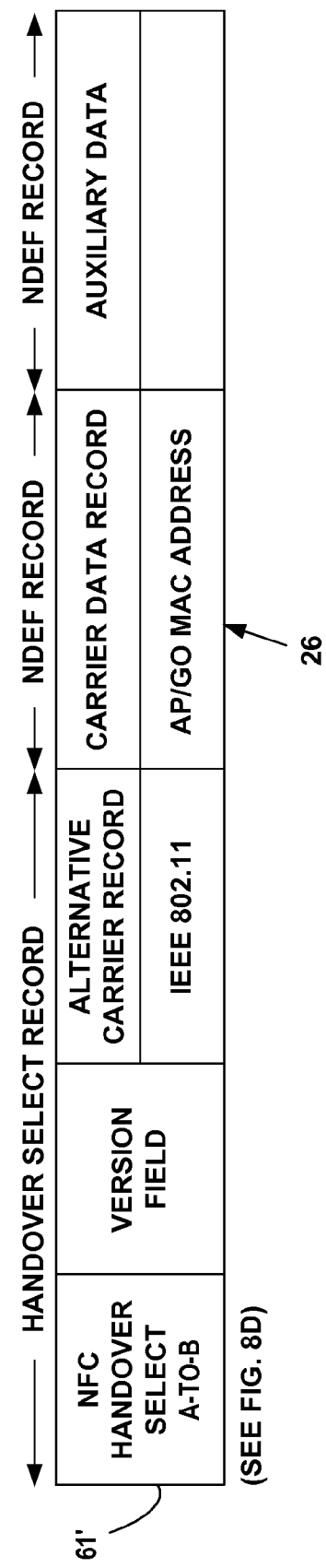
FIG. 9A
FIG. 9B

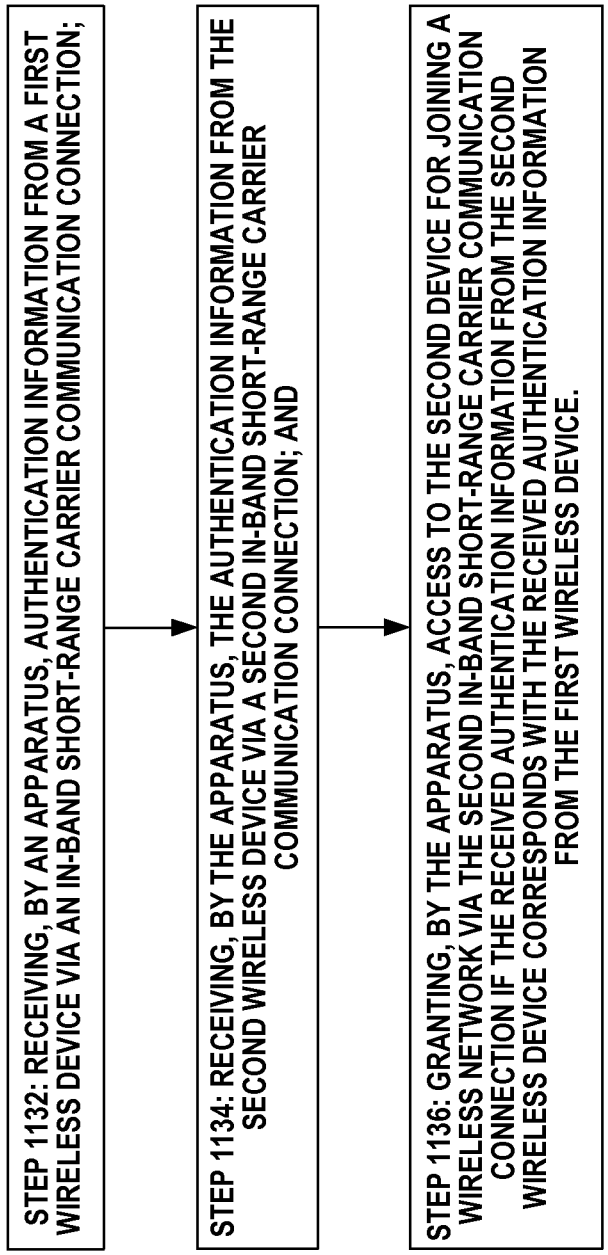

US 9,288,228 B2

METHOD, APPARATUS, AND COMPUTER PROGRAM PRODUCT FOR CONNECTION SETUP IN DEVICE-TO-DEVICE COMMUNICATION

FIELD

The field of the invention relates to wireless communication, and more particularly to connection setup in device-to-device communication using an out-of-band carrier.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange specific information for another communications protocol, which may then be used to create an actual connection in the other communications protocol, such as Bluetooth™ or wireless local area network (WLAN).

SUMMARY

Method, apparatus, and computer program product embodiments are disclosed to enable connection setup in device-to-device communication using out-of-band carrier.

Example embodiments of the invention include a method comprising:

participating, by a first device, in a wireless network managed by at least one of an access point device or a group owner device; and exchanging, by the first device, information with a second device over a wireless out-of-band short-range carrier, the exchanged information comprising in-band communication connection parameters for enabling the second device to join the wireless network and authentication information recognizable by the at least one of an access point device or a group owner device managing the wireless network.

Example embodiments of the invention include the method further comprising:

sending, by the first device, the authentication information and the in-band communication connection parameters, to the second device via the wireless out-of-band short-range carrier, to enable the second device to setup an in-band communication connection with the at least one of the access point device or the group owner device according to the in-band communication connection parameters.

Example embodiments of the invention include the method further comprising:

receiving, by the first device, the authentication information from the at least one of the access point device or the group owner device, via an in-band communication connection; and sending, by the first device, the authentication information and the in-band communication connection parameters, to the second device via the wireless out-of-band short-range carrier.

Example embodiments of the invention include the method further comprising:

receiving, by the first device, from the at least one of the access point device or the group owner device, a value based on one of a random number, device password, public key encryption, Diffie-Hellman key exchange, or Advanced Encryption Standard symmetric key exchange as the authentication information, via an in-band communication connection; and sending, by the first device, the authentication information and the in-band communication connection parameters, to the second device via the wireless out-of-band short-range carrier.

Example embodiments of the invention include the method further comprising:

receiving, by the first device, from the second device, the authentication information via the wireless out-of-band short-range carrier, for forwarding to the at least one of the access point device or the group owner device; and sending, by the first device, to the second device the in-band communication connection parameters via the wireless out-of-band short-range carrier, for connection to the at least one of the access point device or the group owner device.

Example embodiments of the invention include the method further comprising:

receiving, by the first device, from the second device, the authentication information via the wireless out-of-band short-range carrier, for forwarding to the at least one of the access point device or the group owner device, the authentication information being a value based on one of a random number, device password, public key encryption, Diffie-Hellman key exchange, or Advanced Encryption Standard symmetric key exchange; and sending, by the first device, to the second device the in-band communication connection parameters via the wireless out-of-band short-range carrier, for connection to the at least one of the access point device or the group owner device.

Example embodiments of the invention include an apparatus comprising:

at least one processor;

at least one memory including computer program code;

the at least one memory and the computer program code configured to, with the at least one processor, cause the apparatus at least to:

participate in a wireless network managed by at least one of an access point device or a group owner device; and exchange information with a second device over a wireless out-of-band short-range carrier, the exchanged information comprising in-band communication connection parameters for enabling the second device to join the wireless network and authentication information recognizable by the at least one of an access point device or a group owner device managing the wireless network.

Example embodiments of the invention include the apparatus further comprising: wherein the wireless out-of-band short-range carrier is one of Near Field Communication, Radio Frequency Identification, Infrared Data Association, or Ultra Wide Band.

Example embodiments of the invention include the apparatus further comprising: wherein the in-band communication connection parameters are based on one of IEEE 802.11 WLAN, Bluetooth BR/EDR, Bluetooth Low Energy, Wireless USB, Ultra Wide-band, ZigBee, digital enhanced cordless telecommunications, HIPERLAN, Global System for Mobile Communications, General Packet Radio service, Enhanced data rates for GSM evolution, Evolution-Data Optimized, or Wideband Code Division Multiple Access.

Example embodiments of the invention include a computer program product comprising computer executable program code recorded on a computer readable non-transitory storage medium, the computer executable program code comprising:

code for participating, by a first device, in a wireless network managed by at least one of an access point device or a group owner device; and code for exchanging, by the first device, information with a second device over a wireless out-of-band short-range carrier, the exchanged information comprising in-band communication connection parameters for enabling the second device to join the wireless network and authentication information recognizable by the at least one of an access point device or a group owner device managing the wireless network.

Example embodiments of the invention include a method comprising:

exchanging, by an apparatus, information with a first device over a wireless out-of-band short-range carrier, the exchanged information comprising in-band communication connection parameters for enabling the apparatus to join a wireless network managed by at least one of an access point device or a group owner device, and authentication information recognizable by the at least one of an access point device or a group owner device managing the wireless network; and transmitting, by the apparatus, the authentication information to the at least one of the access point device or the group owner device via an in-band communication connection to enable the apparatus to join the wireless network, according to the in-band communication connection parameters.

Example embodiments of the invention include the method further comprising:

receiving, by the apparatus, the authentication information and the in-band communication connection parameters, from the first device via the wireless out-of-band short-range carrier, to enable the apparatus to setup an in-band communication connection with the at least one of the access point device or the group owner device according to the in-band communication connection parameters.

Example embodiments of the invention include the method further comprising:

receiving, by the apparatus, the authentication information and the in-band communication connection parameters, from the first device via the wireless out-of-band short-range carrier, the authentication information having been forwarded by the first device from the at least one of the access point device or the group owner device.

Example embodiments of the invention include the method further comprising:

receiving, by the apparatus, the authentication information and the in-band communication connection parameters, from the first device via the wireless out-of-band short-range carrier, the authentication information being a value based on one of a random number, device password, public key encryption, Diffie-Hellman key exchange, or Advanced Encryption Standard symmetric key exchange as the authentication information.

Example embodiments of the invention include the method further comprising:

sending, by the apparatus, to the first device, the authentication information via the wireless out-of-band short-range carrier, for forwarding to the at least one of the access point device or the group owner device; and receiving, by the apparatus, from the first device, the in-band communication connection parameters via the wireless out-of-band short-range carrier, for connection to the at least one of the access point device or the group owner device.

Example embodiments of the invention include the method further comprising:

sending, by the apparatus, to the first device, the authentication information via the wireless out-of-band short-range carrier, for forwarding to the at least one of the access point device or the group owner device, the authentication information being a value based on one of a random number, device password, public key encryption, Diffie-Hellman key exchange, or Advanced Encryption Standard symmetric key exchange; and receiving, by the apparatus, from the first device, the in-band communication connection parameters via the wireless out-of-band short-range carrier, for connection to the at least one of the access point device or the group owner device.

Example embodiments of the invention include an apparatus comprising:

at least one processor;

at least one memory including computer program code;

the at least one memory and the computer program code configured to, with the at least one processor, cause the apparatus at least to:

exchange information with a first device over a wireless out-of-band short-range carrier, the exchanged information comprising in-band communication connection parameters for enabling the apparatus to join a wireless network managed by at least one of an access point device or a group owner device, and authentication information recognizable by the at least one of an access point device or a group owner device managing the wireless network; and transmit the authentication information to the at least one of the access point device or the group owner device via an in-band communication connection to enable the apparatus to join the wireless network, according to the in-band communication connection parameters.

Example embodiments of the invention include the apparatus further comprising: wherein the wireless out-of-band short-range carrier is one of Radio Frequency Identification, Near Field Communication, Infrared Data Association, or Ultra Wide Band.

Example embodiments of the invention include the apparatus further comprising: wherein the in-band communication connection parameters are based on one of IEEE 802.11 WLAN, Bluetooth BR/EDR, Bluetooth Low Energy, Wireless USB, Ultra Wide-band, ZigBee, digital enhanced cordless telecommunications, HIPERLAN, Global System for Mobile Communications, General Packet Radio service, Enhanced data rates for GSM evolution, Evolution-Data Optimized, or Wideband Code Division Multiple Access.

Example embodiments of the invention include a computer program product comprising computer executable program code recorded on a computer readable non-transitory storage medium, the computer executable program code comprising:

code for exchanging, by an apparatus, information with a first device over a wireless out-of-band short-range carrier, the exchanged information comprising in-band communication connection parameters for enabling the apparatus to join a wireless network managed by at least one of an access point device or a group owner device, and authentication information recognizable by the at least one of an access point device or a group owner device managing the wireless network; and code for transmitting, by the apparatus, the authentication information to the at least one of the access point device or the group owner device via an in-band communication connection to enable the apparatus to join the wireless network, according to the in-band communication connection parameters.

Example embodiments of the invention include a method comprising:

transmitting, by an apparatus, authentication information, to a first wireless device via an in-band communication connection, to enable the first device to transfer to a second wireless device the authentication information via an out-of-band short-range carrier communication connection with the second device;

receiving, by the apparatus, the authentication information, from the second wireless device, via a second in-band short-range carrier communication connection; and granting, by the apparatus, access to the second device to join a wireless network via the second in-band communication connection, if the received authentication information corresponds with the transmitted authentication information.

Example embodiments of the invention include an apparatus comprising:

at least one processor;

at least one memory including computer program code;

the at least one memory and the computer program code configured to, with the at least one processor, cause the apparatus at least to:

transmit authentication information, to a first wireless device via an in-band communication connection, to enable the first device to transfer to a second wireless device the authentication information via an out-of-band short-range carrier communication connection with the second device;

receive the authentication information, from the second wireless device, via a second in-band short-range carrier communication connection; and grant access to the second device to join a wireless network via the second in-band communication connection, if the received authentication information corresponds with the transmitted authentication information.

Example embodiments of the invention include a computer program product comprising computer executable program code recorded on a computer readable non-transitory storage medium, the computer executable program code comprising:

code for transmitting, by an apparatus, authentication information, to a first wireless device via an in-band communication connection, to enable the first device to transfer to a second wireless device the authentication information via an out-of-band short-range carrier communication connection with the second device;

code for receiving, by the apparatus, the authentication information, from the second wireless device, via a second in-band short-range carrier communication connection; and code for granting, by the apparatus, access to the second device to join a wireless network via the second in-band communication connection, if the received authentication information corresponds with the transmitted authentication information.

Example embodiments of the invention include a method comprising:

receiving, by an apparatus, authentication information from a first wireless device via an in-band short-range carrier communication connection;

receiving, by the apparatus, the authentication information from the second wireless device via a second in-band short-range carrier communication connection; and granting, by the apparatus, access to the second device for joining a wireless network via the second in-band short-range carrier communication connection if the received authentication information from the second wireless device corresponds with the received authentication information from the first wireless device.

Example embodiments of the invention include an apparatus comprising:

at least one processor;

at least one memory including computer program code;

the at least one memory and the computer program code configured to, with the at least one processor, cause the apparatus at least to:

receive authentication information from a first wireless device via an in-band short-range carrier communication connection;

receive the authentication information from the second wireless device via a second in-band short-range carrier communication connection; and grant access to the second device for joining a wireless network via the second in-band short-range carrier communication connection if the received authentication information from the second wireless device corresponds with the received authentication information from the first wireless device.

Example embodiments of the invention include a computer program product comprising computer executable program code recorded on a computer readable non-transitory storage medium, the computer executable program code comprising:

code for receiving by one of an access point device or a group owner device, authentication information, from a first wireless device via an in-band short-range carrier communication connection, the first wireless device having received the authentication information via an out-of-band communication connection from a second wireless device;

code for receiving by the one of the access point device or the group owner device, the authentication information, from the second wireless device, via a second in-band short-range carrier communication connection; and code for granting by the one of the access point device or the group owner device, access to the second device via the second in-band short-range carrier communication connection, if the received authentication information from the second wireless device corresponds with the received authentication information from the first wireless device.

The resulting embodiments enable out-of-band short-range communication carrier transport switching for connection setup in device-to-device communication with an access point device or a group owner device.

DESCRIPTION OF THE FIGURES

FIG. 3A is an example embodiment of one example of an NFC handover request message from the device B to the device A with a request for information to enable device B to obtain network access through the hub device AP/GO, in accordance with example embodiments of the invention.

FIG. 3B is an example embodiment of one example an NFC handover select message sent from device A to device B to provide connectivity settings and the authentication information recognizable by the hub device AP/GO, to obtain network access through the hub device AP/GO, according to an embodiment of the present invention.

FIG. 7 is an example sequence diagram of an example embodiment showing the interaction of device A, device B, and the hub device AP/GO of FIG. 1B, according to an embodiment of the present invention.

FIG. 9A is one example embodiment of an NFC handover request message from the device B to the device A with a request for information and including the authentication information, to enable device B to obtain network access through the hub device AP/GO, in accordance with example embodiments of the invention.

FIG. 9B is one example embodiment an NFC handover select message sent from device A to device B to provide connectivity settings to obtain network access through the hub device AP/GO, according to an embodiment of the present invention.

FIG. 11C is an example flow diagram of operational steps of one example embodiment of the method carried out between device A, device B and hub device AP/GO of FIG. 2, FIG. 4, and FIGS. 8A-8H, according to an embodiment of the present invention.

DISCUSSION OF EXAMPLE EMBODIMENTS OF THE INVENTION

Figure 1A:
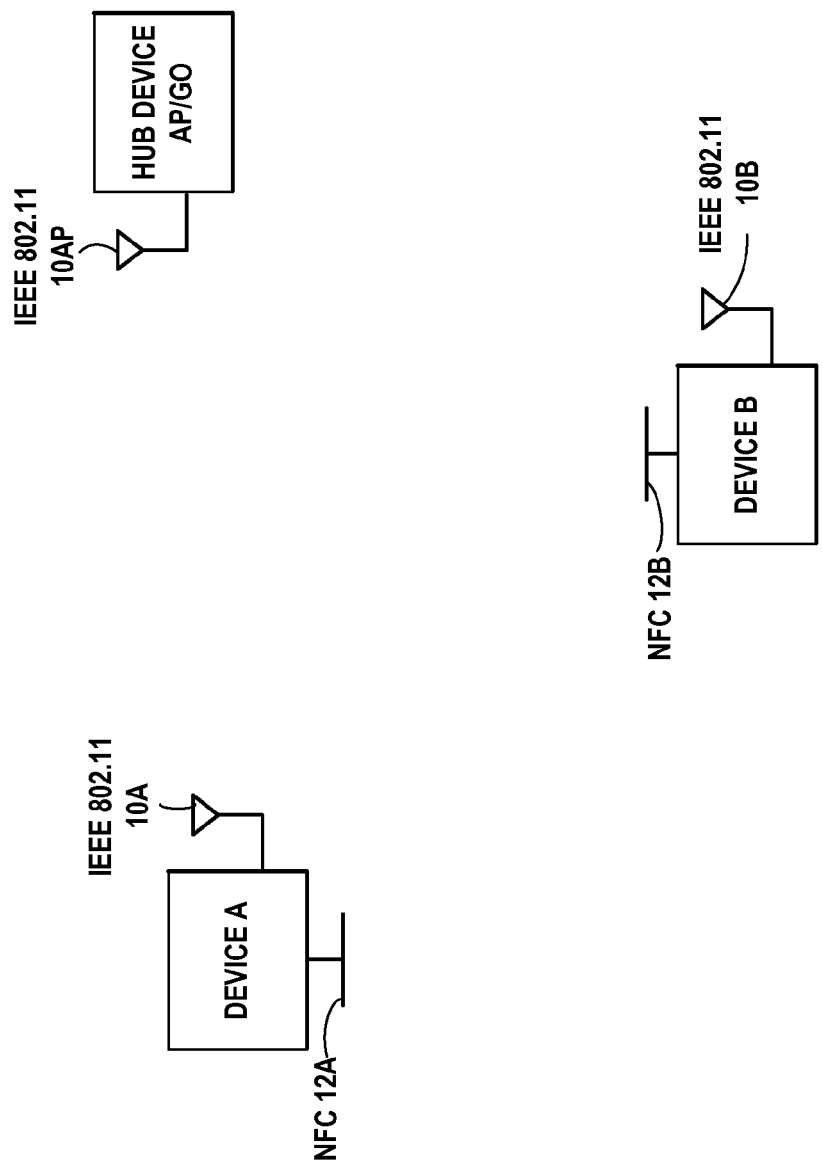
FIG. 1A illustrates an example network diagram before the nodes are connected, wherein device A, device B, and the hub device AP/GO include an in-band short-range carrier transceiver, such as an IEEE 802.11 WLAN transceiver. The device A and device B further include an out-of-band short-range carrier transceiver, such as a Near Field Communication (NFC) transceiver, in accordance with example embodiments of the invention.

This section is organized into the following topics:
A. WLAN Communication Technology—P. 11
1, IEEE 802.11 WLAN
2. Wi-Fi Protected Setup/Wi-Fi Simple Configuration (WSC)
3. Authentication in Wi-Fi Protected Setup/Wi-Fi Simple Configuration
4. Wi-Fi Direct—Software Access Points
B. Near-Field Communication (NFC) Technology—P. 23
C. NFC Connection Handover to WLAN—P. 25
D. Out-of-Band Connection Setup with Access Point or Group Owner Device—P. 26

A. WLAN Communication Technology
1, IEEE 802.11 WLAN

The IEEE 802.11 standard specifies methods and techniques of an exemplary wireless local area network (WLAN) operation. examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard *IEEE 802.11-2007, Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11 ad WLAN specifications that are to provide a very high throughput in higher frequency bands. Applications of these IEEE 802.11 standards include products such as consumer electronics, telephones, personal computers, and access points for both for home and office.

An IEEE 802.11 WLAN may be organized as an independent basic service set (IBSS) or an infrastructure basic service set (BSS). The access point (AP) in an infrastructure basic service set (BSS) IEEE 802.11 WLAN network, is a central hub that must relay all communication between the mobile wireless devices (STAs) in an infrastructure BSS. If a STA in an infrastructure BSS wishes to communicate a frame of data to a second STA, the communication must take two hops. First, the originating STA transfers the frame to the AP. Second, the AP transfers the frame to the second STA. In an infrastructure BSS, the AP either transmits Beacons or responds to probes received from STAs. After a possible authentication of a STA that is conducted by the AP, an association occurs between the AP and a STA enabling data traffic to be exchanged with the AP. The Access Point (AP) in an Infrastructure BSS may bridge traffic out of the BSS onto a distribution network. STAs that are members of the BSS exchange packets only with the AP.

The IEEE 802.11 WLAN uses two types of transmission: Distributed Coordination Function (DCF) and Point Coordination Function (PCF). DCF employs Carrier Sense Multiple Access with Collision Avoidance (CSMA/CA). Every packet sent is positively acknowledged by the receiver. A transmission begins with a Request to Send (RTS) and the receiver responds with a Clear to Send (CTS). The channel is cleared by these two messages, since all STAs that hear the CTS will suppress their own start of a transmission. Then when data packets are transmitted, each has a Network Allocation Vector (NAV) containing a duration value to reserve the channel for the sender and receiver for an interval after the current packet, equal to the NAV duration. The value of the NAV decrements with the passage of time. Once the sender and receiver have reserved the channel, they may hold it for the remaining duration of the NAV value. The last acknowledgement packet (ACK) contains a NAV value of zero, to immediately release the channel. The Point Coordination Function (PCF) is a polling method among the STAs of the BSS, which is coordinated by the access point.

IEEE 802.11 authentication operates at the link level between IEEE 802.11 STAs. IEEE Std 802.11 attempts to control LAN access via the authentication service. IEEE 802.11 authentication is a station service that may be used by all STAs to establish their identity to STAs with which they communicate in both infrastructure and IBSS networks. If a mutually acceptable level of authentication has not been established between two STAs, then an association is not established. IEEE 802.11 defines two authentication methods: Open System authentication and Shared Key authentication. Open System authentication admits any STA to the distribution system. Shared Key authentication relies on wired equivalent privacy to demonstrate knowledge of an encryption key. The IEEE 802.11 authentication mechanism also allows definition of new authentication methods. A robust security network association (RSNA) supports authentication based on IEEE 802.1X-2004, or preshared keys (PSKs). IEEE 802.1X authentication utilizes the Extensible Authentication Protocol (EAP) (IETF RFC 3748-2004) to authenticate STAs and an authentication server (AS) with one another. In IEEE 802.1X, a STA being authenticated and the authenticator device exchange protocol information via the IEEE 802.1X Uncontrolled Port. The IEEE 802.1X Controlled Port is blocked from passing general data traffic between two STAs until an IEEE 802.1X authentication procedure completes successfully over the IEEE 802.1X Uncontrolled Port.

2. Wi-Fi Protected Setup/Wi-Fi Simple Configuration (WSC)

Network setup for IEEE 801.11 WLANs has been simplified by the Wi-Fi Protected Setup™ system that is included in most access points. The Wi-Fi Alliance published the Wi-Fi Protected Setup (WPS) specification 1.0, *Wi-Fi Protected Setup Specification*, Version 1.0h, December 2006 (incorporated herein by reference). *The Wi-Fi Simple Configuration (WSC) Specification*, Version 2.0, Dec. 20, 2010, (incorporated herein by reference), updates the *Wi-Fi Protected Setup Specification*, Version 1.0h. The acronym WSC, for *Wi-Fi Simple Configuration Specification*, may be used interchangeably with the acronym WPS, for Wi-Fi Protected Setup. Wi-Fi Protected Setup facilitates the initial setting up of IEEE 802.11 devices in a Wi-Fi infrastructure network so that they may be more easily configured with security features and so that that new Wi-Fi devices may be added to the network. Wi-Fi Protected Setup allows access points to be set up by entering a PIN. The Protected Setup system uses this information to send data to a computer connected to the access point, to complete the network setup. Wi-Fi Protected Setup defines new IEEE 802.11 information elements (IE) that are included in beacons, probe requests and probe responses. The purpose of these IEs is to advertise the presence of devices that are capable of performing Wi-Fi Protected Setup operations.

Initial discovery of Wi-Fi Simple Configuration devices is accomplished using IEEE 802.11 Information Elements in management frames (Beacon, Probe Request, and Probe Response). If the Enrollee decides to pursue a connection to the network, it initiates an IEEE 802.1X/EAP connection for the Extensible Authentication Protocol (EAP)-based Registration Protocol. The Wi-Fi Simple Configuration Information Element complies with the IEEE 802.11 Information Element format and indicates specific data necessary for network information, capabilities and modes, to configure an Enrollee for the wireless network and to report problems with the Enrollee associating with a specified wireless network with the supplied settings.

The Wi-Fi Protected Setup 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network. *The Wi-Fi Simple Configuration Specification*, Version 2.0, Dec. 20, 2010, (incorporated herein by reference), updates the *Wi-Fi Protected Setup Specification*, Version 1.0h.

A standalone AP that supports Wi-Fi Protected Setup, includes a built-in Registrar and does not use an external Registrar. In initial WLAN setup with Wi-Fi Protected Setup, when initializing in a standalone mode, a Wi-Fi Protected Setup AP automatically chooses a random SSID and channel. A standalone AP that includes a Wi-Fi Protected Setup Registrar, issues keys to Enrollees via the Registration Protocol.

When an Enrollee is initialized, it looks for Beacons from APs and sends probe requests with the WSC information element (IE), into either selected networks or into each network sequentially. It may also send probe requests to each IEEE 802.11 channel with the WSC IE included. It looks for the WSC IE in probe-responses that it receives and can engage with one or more Registrars to further discover Registrar capabilities and to see if the user has selected a Registrar. The Enrollee may continue looking for selected Registrar flags in Beacons, probe-responses and any M2 messages and may cease scanning when it finds a Registrar indicating that it is prepared to configure the Enrollee.

The following example describes an example in-band setup procedure using Wi-Fi Protected Setup for adding Member devices using a Standalone AP/Registrar. The user may convey the Enrollee's device password to the AP/Registrar using keyboard entry or an out-of-band channel with Near-Field Communication (NFC) Connection Handover. This example does not show the exchange of preliminary M1 and M2D messages that may take place after the probe message exchange, because the Enrollee may be waiting for the user to configure the AP/Registrar with the Enrollee's device password.

1. The Enrollee sends its Discovery data in a probe request to a Wi-Fi Protected Setup AP or ad hoc wireless Registrar. The AP or wireless Registrar responds with its own Discovery data in the probe response.

2. The user may be prompted to enter the Enrollee's device password into the AP/Registrar using a keypad interface or an out-of-band channel.

3. The Enrollee connects and initiates the IEEE 802.1X port-based Network Access Control procedure for port-based authentication.

4. The Enrollee and Registrar exchange messages M1-M8 to provision the Enrollee.

5. The Enrollee disassociates and reconnects, using its new WLAN authentication Credential. The Enrollee is now connected to the network with its new configuration.

3. Authentication in Wi-Fi Protected Setup/Wi-Fi Simple Configuration

The *Wi-Fi Simple Configuration Specification*, Version 2.0 (renamed from the original name "Wi-Fi Protected Setup"), uses the IEEE 802.1X Port-Based Authentication and Extensible Authentication Protocol (EAP) to transport in-band Registration Protocol messages. This protocol is mapped onto a custom EAP method described below. Wi-Fi Simple Configuration does not require the AP to support remote authentication dial-in user service (RADIUS) (IETF RFC 2865-2000), and the network need not include an authentication server. In fact, many Wi-Fi Simple Configuration APs may support IEEE 802.1X only to configure Wi-Fi Protected Access 2 (WPA2)-Personal Credentials using Wi-Fi Simple Configuration. Enrollees using Wi-Fi Simple Configuration are not granted direct access to the WLAN through the Wi-Fi Simple Configuration custom EAP method. The EAP method is used to configure the Enrollee with a Credential that can be used subsequently with whatever access method is supported by that WLAN. For example, if the AP only supports WPA2-Personal with a network-wide shared Pre-Shared Key (PSK), then the Enrollee would run the 802.1X exchange to obtain the PSK, disassociate, and then reconnect and use WPA2-Personal to access the WLAN. Alternatively, if the AP supports 802.1X authentication, the Enrollee may first run the Wi-Fi Simple Configuration EAP method to obtain a shared secret Credential and then reconnect using that secret in conjunction with another EAP method to access the WLAN.

The Wi-Fi Simple Configuration EAP method (EAP-WSC) can be used for Registrar and Enrollee discovery and for Credential establishment. The first time the Enrollee encounters a new WLAN, it sends out its Discovery information and executes the EAP-WSC method. In both the Discovery message and in Registration Protocol Message M1, the Enrollee provides information about itself to the WLAN. The M2 and M2D messages sent to the Enrollee likewise provide information about the available Registrars. When the Enrollee first discovers and attempts to connect to the WLAN, the WLAN's Registrar(s) may not yet know the Enrollee's device password. Therefore, Registrars without the device password respond with M2D messages. Although these M2D messages are unauthenticated, they can help Enrollees with rich user interfaces, to guide the user through the enrollment process.

As the Enrollee scans over the M2D messages sent by the network, it may discover that none of them possesses its device password. At this point, the Enrollee has an opportunity to prompt the user to perform a trust bootstrapping operation such as connecting an available out-of-band channel or entering a device password into one of the available Registrars. If the user decides to enter the Enrollee's device password into the Registrar, the Enrollee can reconnect and run the EAP method once more to perform the complete Registration Protocol. If the Enrollee has no user interface to lead the user through the enrollment, it is likely that one or more of the WLAN's Registrars can do this. Both the Registrar and the Enrollee are given sufficient information about each others' capabilities through the EAP method to successfully lead the user through the enrollment. If the user decides to use an out-of-band channel for registration, then message M2 is implicitly authenticated by the channel and can carry the network configuration data.

The AP functions as the EAP authenticator on the WLAN. Thus, the AP generates EAP Request messages and Enrollees and Registrars generate EAP Responses. If the Registrar is external to the AP, then it uses universal plug and play (UPnP) to exchange Registration Protocol messages with the AP. A Registrar may also function in the role of an 802.1X authenticator, which is useful for networks with legacy APs.

The Wi-Fi Simple Configuration EAP method uses EAP, as specified in RFC 3748, and Extensible Authentication Protocol (EAP) over LAN (EAPoL), as specified in IEEE 802.1X-2001, but does not represent a network authentication protocol. Rather Wi-Fi Simple Configuration utilizes the 802.1X data connection for acquiring settings necessary for connecting to the network and the resulting EAP exchange must always terminate with EAP-Failure.

When the Enrollee decides to connect to the network and run the Wi-Fi Simple Configuration EAP method, it associates with the AP and sends an EAPoL-Start message. The AP responds with an EAP-Request/Identity. The Enrollee sends an EAP-Response/Identity containing the defined Wi-Fi Alliance name for a Simple Configuration Enrollee ("WFA-SimpleConfig-Enrollee-1-0"). This causes the AP to start running the Simple Configuration EAP method. The Registration Protocol messages are exchanged until M8 is received and validated by the Enrollee. If it successfully processes M8, the Enrollee sends an EAP-Response/Done message to the authenticator, which sends the WSC_Done message to any External Registrar and the authenticator returns an EAP-Failure message to the Enrollee. An Enrollee should assume that the received credentials are valid after successfully processing message M8 and sending the WSC_Done message.

The Enrollee then disassociates and reconnects with the Credential obtained from M8's ConfigData. If M2D is received by the Enrollee, it should respond with an ACK message so that the AP can continue to send it discovery messages from other Registrars. After the AP sends an EAP-failure to the Enrollee, the Enrollee can do one of two things (given that the AP did not de-authenticate the Enrollee after sending the EAP-Failure): it can disconnect from the AP and reconnect some time later to rerun the Wi-Fi Simple Configuration EAP method by sending an EAPoL-Start message or it can stay connected to the AP and rerun the Wi-Fi Simple Configuration EAP method by sending another EAPoL-Start message.

Once the Enrollee sends an M3 message, both the Registrar and the Enrollee must proceed in lock-step fashion until either a failure or until success occurs (indicated by the Done response message). If the Enrollee (IEEE 802.1X supplicant) detects any errors in these later phases, it responds by sending a NACK message and transitioning to the termination state to terminate the connection. At this point, the Enrollee computes a fresh device password for use in the next instance of the Registration Protocol. If the same password is reused with multiple instances of the protocol, it will be susceptible to active attack.

The Registration Protocol Messages M1 to M8 are described in the Wi-Fi Simple Configuration Specification, Version 2.0. They include an exchange of public keys, description of the sending device, including its MAC address and device capabilities, and various message authentication values, culminating in the Registrar sending to the Enrollee credentials for accessing the network.

A credential is a data structure issued by a Registrar to an Enrollee, allowing the latter to gain access to the network. With out-of-band configuration, WLAN credentials are sent across the out-of-band channel to the Enrollee. The NFC interfaces operating in peer-to-peer mode between an AP or Group Owner (GO) having an integrated Registrar and an Enrollee device, have the strongest security properties supported by the Wi-Fi Simple Configuration Specification, because practical man-in-the-middle attacks against NFC are not feasible. In this mode, a 1536-bit Diffie-Hellman exchange is performed over the NFC interface, and WLAN settings are encrypted using 128-bit Advanced Encryption Standard (AES) and delivered over the same interface between an AP or Group Owner (GO) and an Enrollee device. The Diffie-Hellman public keys and WLAN settings are implicitly authenticated by both the Registrar and the Enrollee, because they are received over the NFC channel.

The credential shown in the following Table 1, is a compound attribute issued by an AP or Group Owner (GO) having an integrated Registrar, representing a single WLAN Credential. There can be multiple instances of the credential attribute. The Wi-Fi Simple Configuration Specification provides the following table that lists the attributes in Credential ("R" means required and "O" means optional):

TABLE 1

| Credential | | |
|---|---|---|
| Attribute | R/O | Notes, Allowed Values |
| 1. Network Index | 2. R | 3. Deprecated - use fixed value 1 for backwards compatibility. |
| 4. SSID | 5. R | 6. SSID of network. |
| 7. Authentication Type | 8. R | 9. The authentication type used in this network. |
| 10. Encryption Type | 11. R | 12. The encryption type used in this network. |

TABLE 1-continued

| Credential | | |
|---|---|---|
| Attribute | R/O | Notes, Allowed Values |
| 13. Network Key Index | 14. O | 15. Deprecated. Only included by WSC 1.0 devices. Ignored by WSC 2.0 or newer devices. |
| 16. Network Key | 17. R | 18. |
| 19. MAC Address | 20. R | 21. Member device's MAC address. |
| 22. EAP Type | 23. O | 24. |
| 25. EAP Identity | 26. O | 27. |
| 28. Key Provided Automatically | 29. O | 30. |
| 31. 802.1X Enabled | 32. O | 33. |
| 34. Network Key Shareable (inside WFA Vendor Extension) | 35. O | 36. If present, this attribute indicates whether the Network Key can be shared or not with other devices. |
| 37. <other . . . > | 38. O | 39. Multiple attributes are permitted. |

4. Wi-Fi Direct—Software Access Points

The Wi-Fi Alliance has developed a Wi-Fi Peer-to-Peer technology named Wi-Fi Direct™ that is specified in the *Wi-Fi Alliance Peer-to-Peer Specification*, October 2010 (incorporated herein by reference). Wi-Fi Direct, is also referred to herein as Peer-to-Peer or P2P. Wi-Fi Direct enables IEEE 802.11a, g, or n devices to connect to one another, peer-to-peer, without prior setup or the need for wireless access points. Wi-Fi Direct embeds a software access point into any device, which provides a version of Wi-Fi Protected Setup. When a device enters the range of a STA supporting Wi-Fi Direct (a Wi-Fi Direct device), it can connect to it and then gather setup information using a Wi-Fi Protected Setup transfer. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the existing protocol, and then gather setup information using a Wi-Fi Protected Setup 2.0 transfer.

Wi-Fi Direct enables IEEE 802.11 devices that support Wi-Fi Direct, to connect to one another, point-to-point, without joining a network. The specification may be implemented in any Wi-Fi device. Devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any device that wishes to support Wi-Fi Direct. The soft AP provides a version of Wi-Fi Protected Setup 1.0 by entering a PIN or pressing a button. When a device enters the range of the Wi-Fi Direct device, it may connect to it using the existing protocol, and then gather setup information using a Wi-Fi Protected Setup 1.0 transfer.

Wi-Fi Direct-certified devices may create direct connections between Wi-Fi client devices without requiring the presence of a traditional Wi-Fi infrastructure network of an access point or router. Wi-Fi Direct-certified devices support connection with existing legacy Wi-Fi devices using the IEEE 802.11a/g/n protocols. Wi-Fi Direct Device Discovery and Service Discovery features allow users to identify available devices and services before establishing a connection, for example, discovering which Wi-Fi networks have a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer (P2P) connection. Wi-Fi Direct devices may join infrastructure networks as stations (STAs) and may support Wi-Fi Protected Setup enrollee functionality. Wi-Fi Direct devices may connect by forming Groups in a one-to-one or one-to-many topology. The Groups functions in a manner similar to an infrastructure basic service set (BSS). A single Wi-Fi Direct device will be the Group Owner (GO) that manages the Group, including controlling which devices are allowed to join and when the Group is started or terminated. The Group Owner (GO) will appear as an access point to legacy clients devices.

Wi-Fi Direct devices include a Wi-Fi Protected Setup Internal Registrar functionality and communication between Clients in the Group. Wi-Fi Direct devices may be a Group Owner (GO) of a Group and may be able to negotiate which device adopts this role when forming a Group with another Wi-Fi Direct device. A Group may include both Wi-Fi Direct devices and legacy devices (i.e., that are not compliant with the Wi-Fi Alliance Peer-to-Peer Specification). Legacy Devices can only function as Clients within a Group.

Wi-Fi Direct devices may support Discovery mechanisms. Device Discovery is used to identify other Wi-Fi Direct devices and establish a connection by using a scan similar to that used to discover infrastructure access points. If the target is not already part of a Group, a new Group may be formed. If the target is already part of a Group, the searching Wi-Fi Direct device may attempt to join the existing Group. Wi-Fi Protected Setup may be used to obtain credentials from the Group Owner (GO) and authenticate the searching Wi-Fi Direct device. Wi-Fi Direct devices may include Service Discovery that enables the advertisement of services supported by higher layer applications to other Wi-Fi Direct devices. Service Discovery may be performed at any time (e.g. even before a connection is formed) with any other discovered Wi-Fi Direct device.

A Group may be created by a single Wi-Fi Direct device, such as when connecting a legacy device. When forming a connection between two Wi-Fi Direct devices, a Group may be formed automatically and the devices may negotiate to determine which device is the Group Owner. The Group Owner may decide if this is a temporary (single instance) or persistent (multiple, recurring use) Group. After a Group is formed, a Wi-Fi Direct device may invite another Wi-Fi Direct device to join the Group. The decision of whether or not to accept an invitation may be left to the invited Wi-Fi Direct device.

Concurrent Wi-Fi Direct Devices may participate in multiple Groups, simultaneously, each group requires own Wi-Fi stack. A Wi-Fi Direct Device that may be in a Group while maintaining a WLAN infrastructure connection at the same time is considered a Concurrent Device or a dual stack device. For example, a laptop connected directly to a printer while simultaneously using a WLAN connection is operating as a Concurrent Device. Concurrent connections may be supported by a single radio and may support connections on different channels. Concurrent operation may be supported by multiple protocol stacks, for example, one for operation as a WLAN-STA and one for operating as a Wi-Fi Direct device. For example, two separate physical MAC entities may be maintained, each associated with its own PHY entity, or they may use a single PHY entity supporting two virtual MAC entities.

The *Wi-Fi Peer-to-Peer Technical Specification* v1.1, 2010 published by the Wi-Fi Alliance, provides for provisioning in Wi-Fi Direct networks. Provisioning is a phase of peer-to-peer group formation in which credentials for the peer-to-peer group are exchanged based on the use of Wi-Fi Simple Configuration. Credentials are information that is required to join a peer-to-peer group as defined in the Wi-Fi Simple Configuration Specification.

To allow for peer-to-peer device configuration, peer-to-peer devices may delay starting the provisioning phase until the expiration of the larger of the peer-to-peer group owner's (GO) configuration time and the peer-to-peer client's client configuration time, based on respective configuration timeout attributes exchanged during a preceding group owner negotiation.

The peer-to-peer device selected as peer-to-peer group owner (GO) during group owner negotiation may start a peer-to-peer group session using the credentials it intends to use for that group. The peer-to-peer group owner (GO) may use the operating channel indicated during group owner negotiation, if available. The peer-to-peer client may connect to the peer-to-peer group owner to obtain credentials. If the operating channel is not available the peer-to-peer group owner may use another channel from a channel list attribute sent in the group owner negotiation confirmation frame. The peer-to-peer client may have to scan to find the peer-to-peer group owner if the intended operating channel is not available. A group formation bit in a peer-to-peer group capability bitmap of the peer-to-peer capability attribute may be set to one until provisioning succeeds.

Provisioning may be executed in Wi-Fi Direct networks, as described, for example, in the *Wi-Fi Simple Configuration (WSC) Specification*, Version 2.0, Dec. 20, 2010. The peer-to-peer group owner (GO) may serve the role as the access point with an internal registrar. It will only allow association by the peer-to-peer device that it is currently with in a group formation. Since the user has entered the WSC PIN or triggered the WSC pushbutton functionality on both devices, the registrar may send an M2 message in response to an M1 message. The peer-to-peer client may serve the role as the STA enrollee. It may associate to the peer-to-peer device that it is currently with in the group formation.

If provisioning fails, then group formation ends and the peer-to-peer group owner (GO) may end the peer-to-peer group session. If provisioning fails, the peer-to-peer device may retry group formation or return to device discovery. On successful completion of provisioning in Wi-Fi Direct networks, the peer-to-peer group owner (GO) may set the group formation bit in the peer-to-peer group capability bitmap of the peer-to-peer capability attribute to zero. At this point the peer-to-peer client may join the peer-to-peer group in the Wi-Fi Direct network, using the credentials supplied during provisioning.

B. Near-Field Communication (NFC) Technology

One of the methods provided by the *Wi-Fi Simple Configuration Specification*, Version 2.0, is the Near-Field Communication (NFC) method, in which the user brings a new wireless client device (STA) close to an access point (AP) or Registrar of the Network to allow near field communication between the devices.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

Near-field communication (NFC) technology used in the Wi-Fi Protected Setup (WPS) standard, communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices.

NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, *Connection Handover Technical Specification*, NFC Forum™, Connection Handover 1.2, NFCForum-TS-ConnectionHandover_1.2, 2010-07-07 (incorporated herein by reference). The ISO/IEC 18092 standard defines communication modes for Near Field Communication Interface and Protocol (NFCIP-1) using inductively coupled devices operating at the center frequency of 13,56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

C. NFC Connection Handover to WLAN

The basic handover to a WLAN carrier stores WLAN parameters and credentials on NFC Forum Tags as part of Wi-Fi Protected Setup (WPS). The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The Wi-Fi Protected Setup specification 1.0 uses the term "Registrar" for a device that is able to provide WLAN credentials and "Enrollee" for a device that wants to join a wireless network.

In the *Wi-Fi Simple Configuration Specification*, Version 2.0, Dec. 20, 2010, a Handover Requester with Wi-Fi capability may format an NFC Handover Request Message in the NFC Data Exchange Format (NDEF), that indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in a different network and thus a Connection Handover is required to obtain the peer device's credentials. In the Wi-Fi Protected Setup specification 2.0, the Handover Selector would deduce from this message that the Handover Requester supports a Wi-Fi certified IEEE 802.11 radio. In the Wi-Fi Protected Setup specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, *NFC Forum Data Exchange Format (NDEF) Specification*, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in *NFC Forum Logical Link Control Protocol Specification*, NFC Forum™, 2009 (incorporated herein by reference). The NFC Connection Handover specification, *NFC Forum Connection Handover Specification*, NFC Forum™, 2010-07-07 (incorporated herein by reference), defines the exchange of NDEF messages between two NFC Devices in a negotiated handover to discover and negotiate alternative wireless communication technologies.

The Handover Requester in the Wi-Fi Protected Setup specification 2.0, would then typically use the SSID and Network Key to enroll on the same Wi-Fi network to which the Handover Selector is connected. Further actions depend on the provision of an IP address identifying the Handover Selector, the available services, and the Handover Requester's intended activity.

D. Out-of-Band Connection Setup with Access Point or Group Owner Device

Example embodiments of the invention enable out-of-band short-range communication carrier transport switching for connection setup in device-to-device communication with either an access point device (AP) in an infrastructure network or a group owner (GO) device in a P2P network. FIG. 1A illustrates an example arrangement where device A, such as a cellular telephone, PDA, laptop computer, and the like, includes an in-band short-range carrier transceiver such as an IEEE 802.11 WLAN transceiver. The device A further includes an out-of-band short-range carrier transceiver, such as a Near Field Communication (NFC) transceiver.

FIG. 1A further illustrates device B in the example arrangement, such as a cellular telephone, PDA, laptop computer, and the like, includes an in-band short-range carrier transceiver, such as an IEEE 802.11 WLAN transceiver. Device B is shown as initially not being connected to any WLAN network. The device B also includes an out-of-band short-range carrier transceiver, such as a Near Field Communication (NFC) transceiver.

Figure 1B:
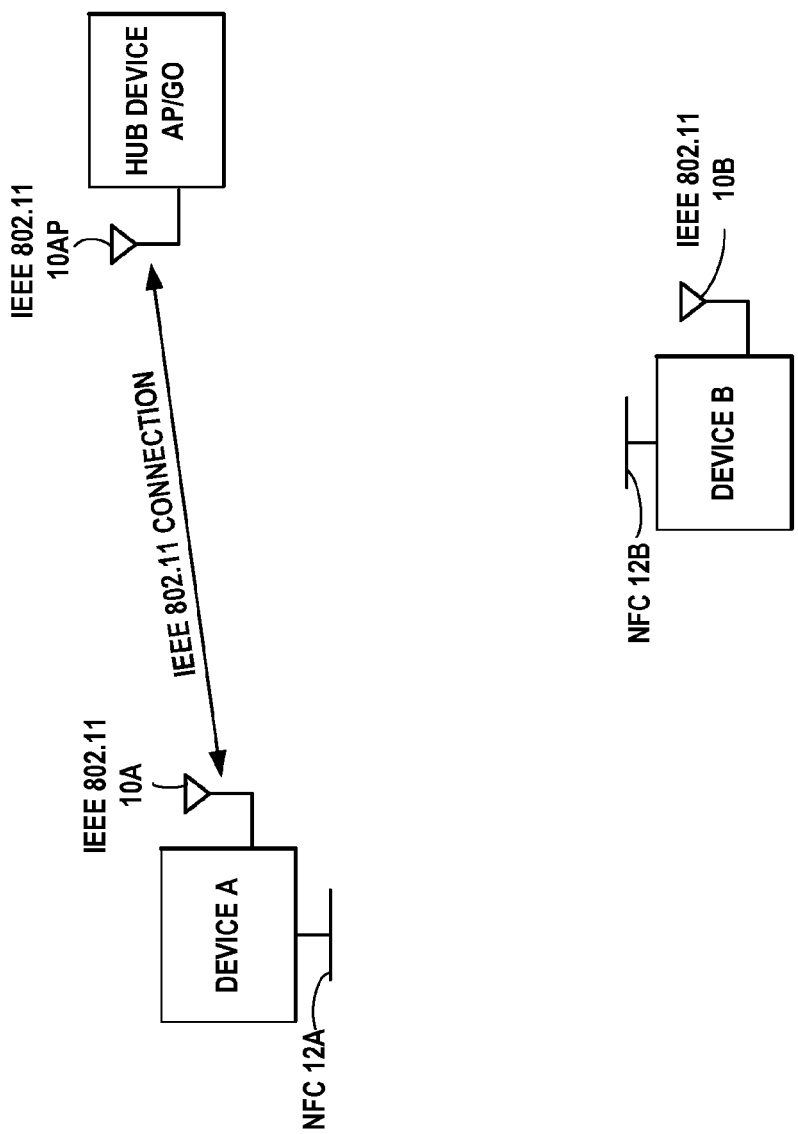
FIG. 1B illustrates the example network diagram of FIG. 1A, wherein device A is shown as having joined a WLAN network by having formed an IEEE 802.11 in-band short-range carrier communication connection with the hub device AP/GO, the hub device AP/GO representing either an access point device (AP) in an infrastructure network or a group owner (GO) device in a P2P network, in accordance with example embodiments of the invention.

In FIG. 1B, device A is shown as having joined a WLAN network by having formed an IEEE 802.11 in-band short-range carrier communication connection with a hub device AP/GO. The hub device AP/GO represents either an access point device (AP) in an infrastructure network or a group owner (GO) device in a P2P network.

Figure 1C:
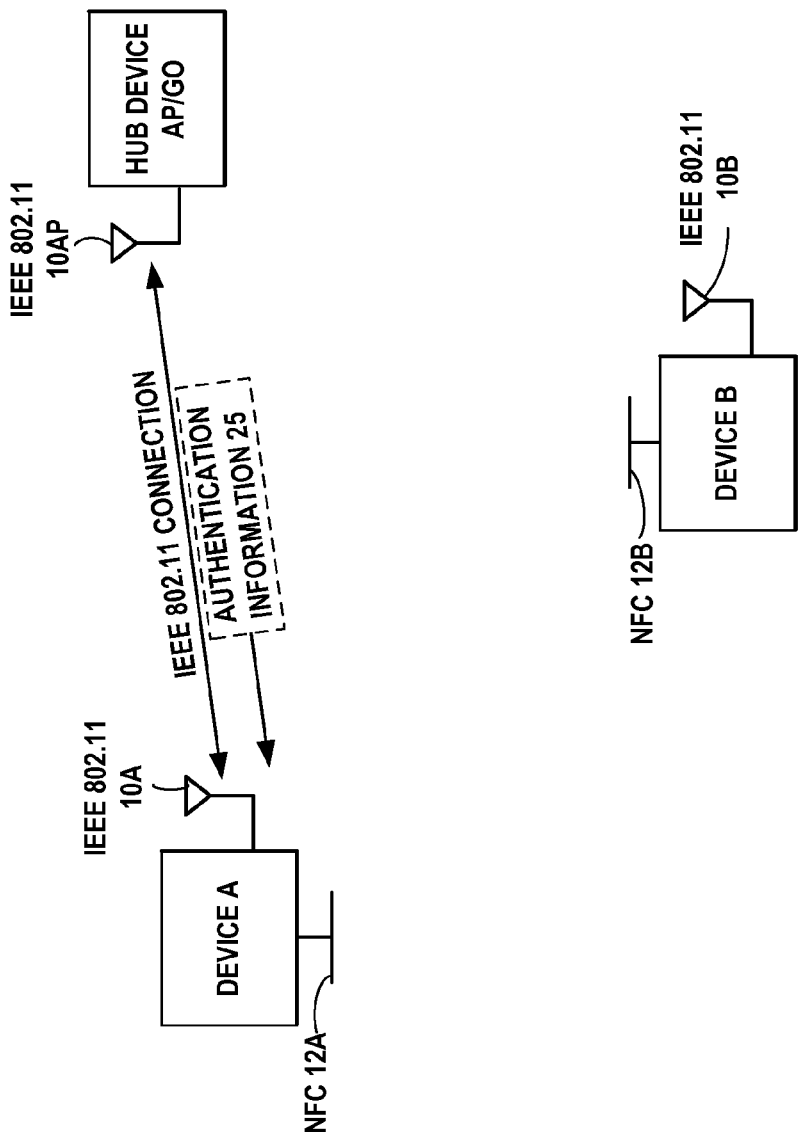
FIG. 1C illustrates the example network diagram of FIG. 1B, wherein the hub device AP/GO is shown transmitting authentication information to device A via the IEEE 802.11 in-band short-range carrier communication connection, in accordance with example embodiments of the invention.

FIG. 1C illustrates an example of the hub device AP/GO transmitting the authentication information 25 to device A via the IEEE 802.11 in-band short-range carrier communication connection, at a time following the establishment of a WLAN network connection between device A and the hub device AP/GO. The authentication information 25 may include, for example, a random number or a value based on public key encryption generated by the hub device AP/GO. The authentication information 25 is recognizable by the hub device AP/GO, which will serve as a proof that the device B did, in fact, engage in an NFC touch with device A. The AP/GO may generate unique random numbers for each client (to improve security). This random number may be sent in a secure manner to the client, such as with WPA/WPA2 that is normally used between an AP/GO and client device. This random number may be updated periodically. This random number or cryptographic information value may be sent during connection setup, as described in FIG. 1C. This authentication information may be refreshed at any time later, for example in a periodic refresh. Also, if the authentication information is used by another device connected to the network by using this NFC touch-to-client method, then it may be appropriate to refresh this authentication information.

The authentication information 25 may include device password (PIN), public key encryption, Diffie-Hellman key exchange, or Advanced Encryption Standard (AES) symmetric key exchange as the authentication information, via an in-band short-range carrier communication connection.

Figure 1D:
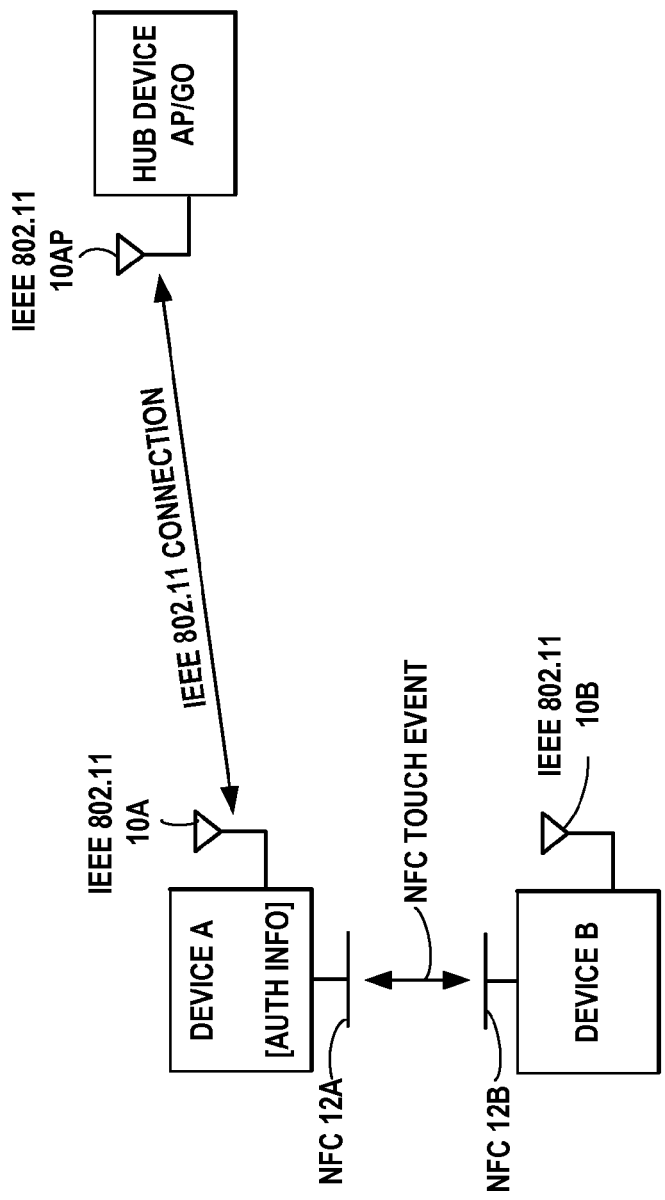
FIG. 1D illustrates the example network diagram of FIG. 1C, wherein an NFC touch event is conducted between devices A and B in order to initiate a short-range carrier transport switch procedure with device B, in accordance with example embodiments of the invention.

FIG. 1D illustrates an example of an NFC touch event between devices A and B. The user of device A would like to include device B in the WLAN network by having it automatically connect to the hub device AP/GO and acquire credentials for network access, without requiring the user to type in a PIN number. To accomplish this, the user of device A touches the NFC transponder of device A to the NFC transponder of device B in order to initiate a short-range carrier transport switch procedure with device B. The NFC touch results in transmitting NFC wireless out-of-band short-range carrier communication signals for providing an NFC out-of-band short-range carrier communication connection with device B.

Figure 1E:
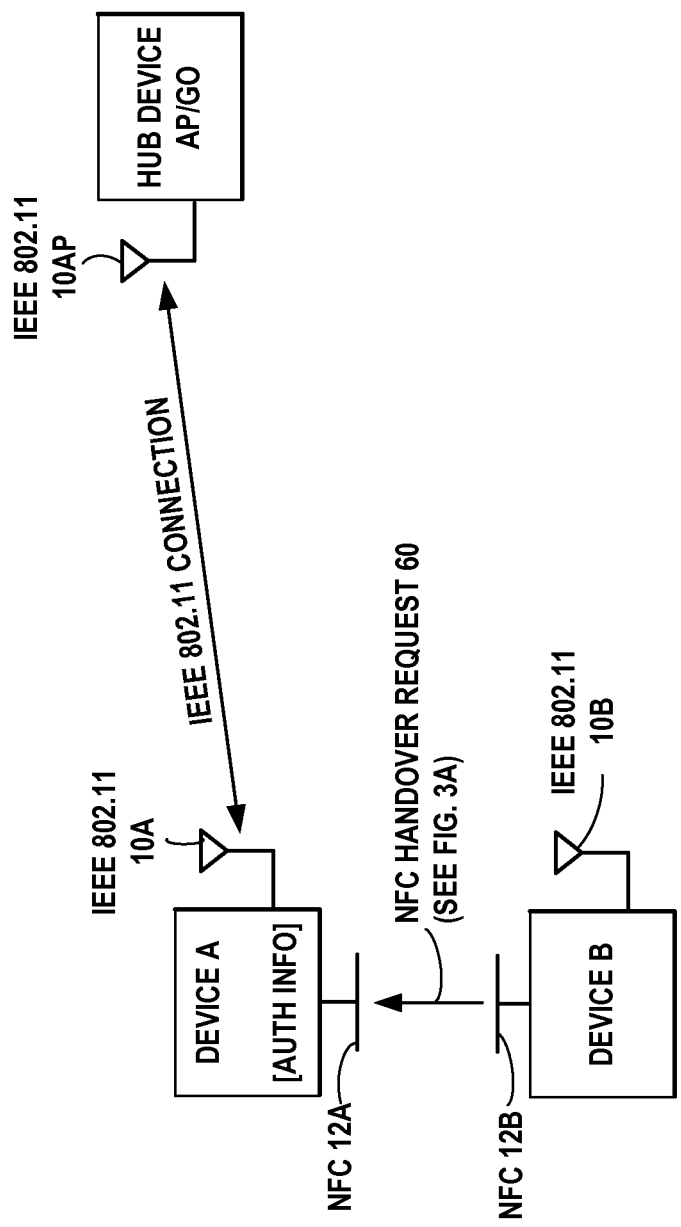
FIG. 1E illustrates the example network diagram of FIG. 1D, of one example wherein device B sends an NFC handover request to device A, in accordance with example embodiments of the invention.

FIG. 1E illustrates one example of device B sending an NFC handover request 60 of FIG. 3A, to device A. When the NFC selector device A has established LLCP communication with the NFC requestor device B, the requestor device B sends a handover request message 60, shown in FIG. 3A, to device A, with its request for information to enable device B to obtain network access through the hub device AP/GO.

Figure 1F:
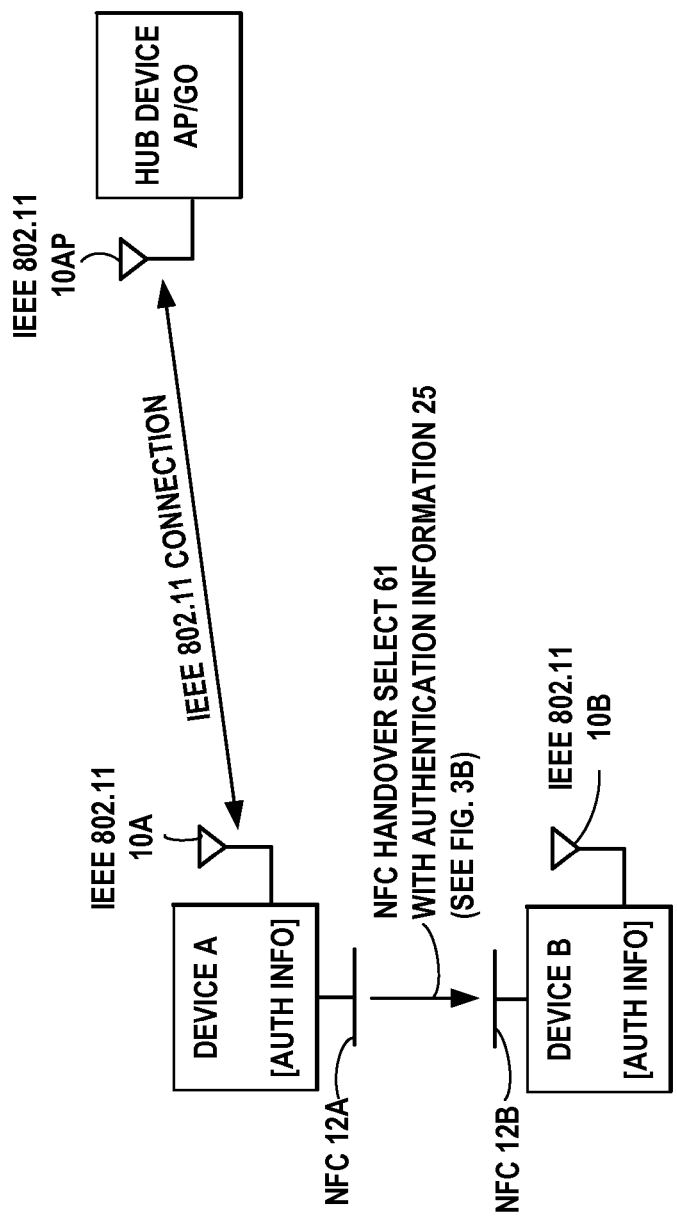
FIG. 1F illustrates the example network diagram of FIG. 1E, of one example wherein device A responds with an NFC handover select that includes the authentication information that is recognizable by the hub device AP/GO and connection information, in accordance with example embodiments of the invention.

FIG. 1F illustrates one example of device A responding with an NFC handover select that includes the authentication information 25. The NFC selector device A then responds by sending to device B, a handover select response message 61, shown in FIG. 3B, including the authentication information 25 and connection information, such as the MAC address 26 of the hub device AP/GO, to carry out a connection setup between device B and the hub device AP/GO.

The authentication information 25 is recognizable by the hub device AP/GO, which will serve as a proof that the device B did, in fact, engage in an NFC touch with device A. The authentication information 25 may include, for example, a random number or a value based on public key encryption that was previously received as the authentication information from the hub device AP/GO, via the IEEE 802.11 in-band short-range carrier communication connection.

Device A may also send to device B, IEEE 802.11 in-band short-range carrier communication connection parameters for connection to the hub device AP/GO, such as the MAC address of the hub device AP/GO, via the NFC out-of-band short-range carrier communication connection. This will enable device B to setup an IEEE 802.11 in-band short-range carrier communication connection with the hub device AP/GO according to the IEEE 802.11 in-band short-range carrier communication connection parameters.

After the NFC touch procedure, Device B possesses the authentication information 25 recognizable by the hub device AP/GO, which will serve as a proof that the device B did, in fact, engage in an NFC touch with device A.

Figure 1G:
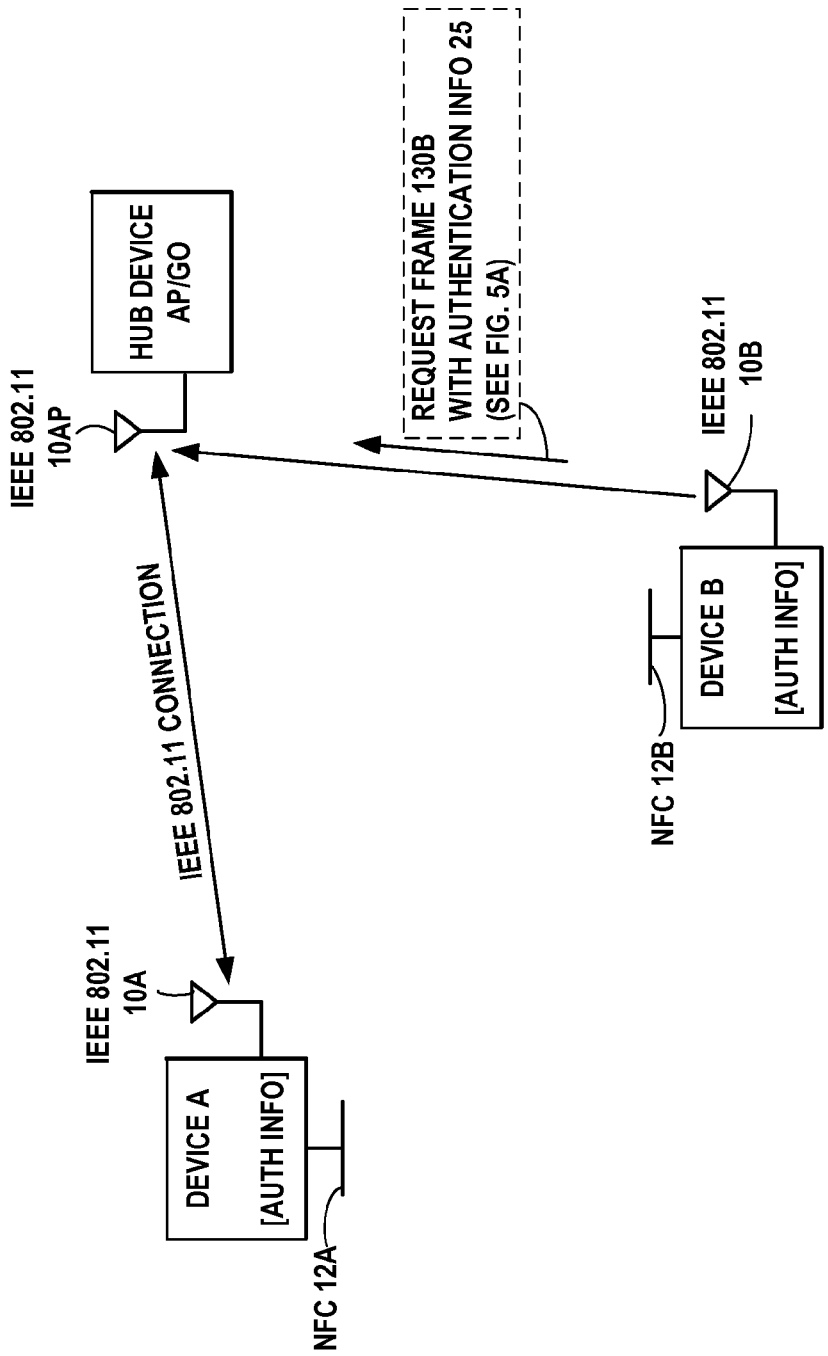
FIG. 1G illustrates the example network diagram of FIG. 1F, wherein device B sends a request frame, for example a probe request frame, with a Wi-Fi Protected Setup (WSC) information element (IE) to the hub device AP/GO in a Wi-Fi Protected Setup procedure. The WSC information element (IE) of includes the authentication information recognizable by the hub device AP/GO, in accordance with example embodiments of the invention.
Figure 5A:
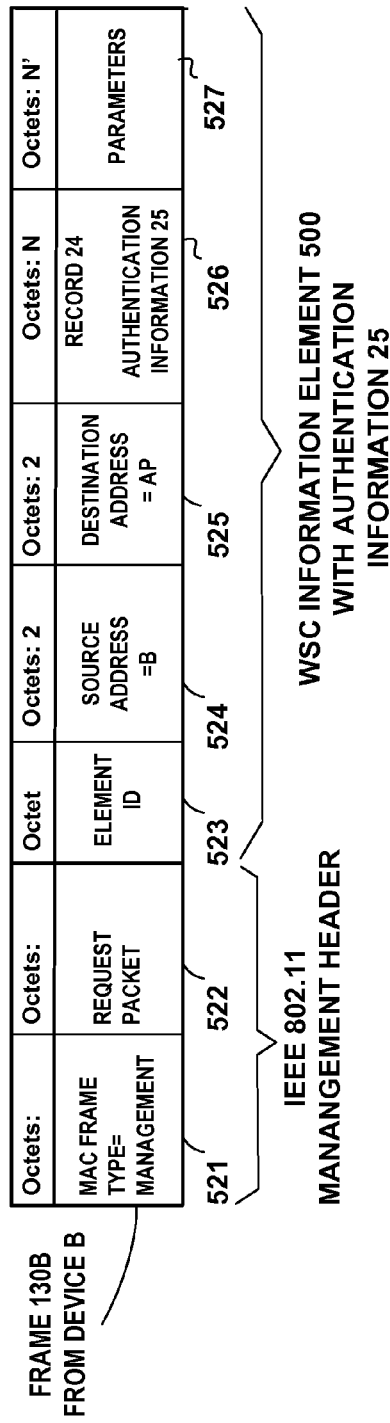
FIG. 5A illustrates one example IEEE 802.11 request frame, for example a probe request frame sent by device B to the hub device AP/GO with the authentication information in a WSC information element, according to an embodiment of the present invention.

FIG. 1G illustrates an example of Device B issuing a request frame, for example a probe request frame 130B with a Wi-Fi Protected Setup (WSC) information element (IE) of FIG. 5A, sending it to the hub device AP/GO in a Wi-Fi Protected Setup procedure. The WSC information element (IE) of FIG. 5A may include the authentication information 25 recognizable by the hub device AP/GO.

Figure 1H:
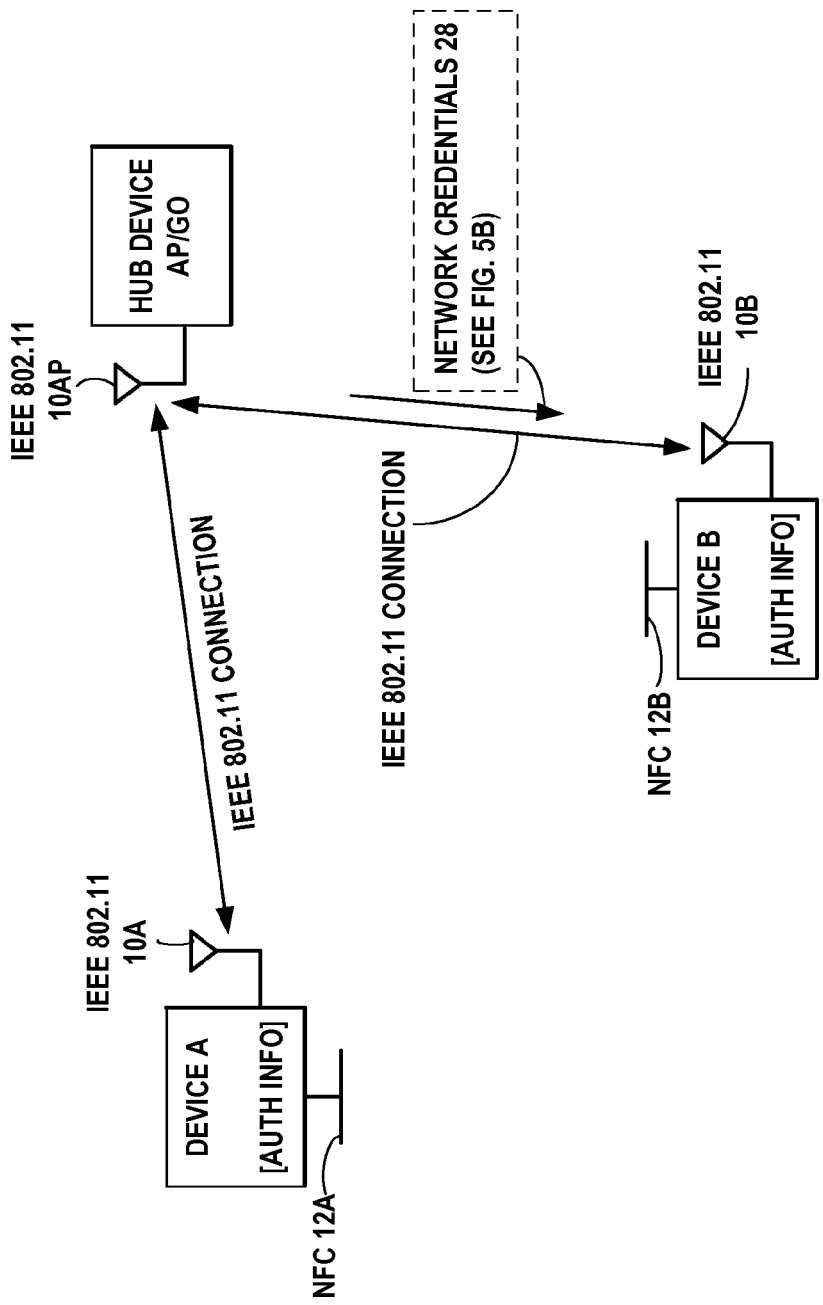
FIG. 1H illustrates the example network diagram of FIG. 1G, wherein the hub device AP/GO recognizes the authentication information that serves as a proof that the device B did, in fact, engage in an NFC touch with device A. The hub device AP/GO grants network access to device B and, after additional signaling, sends credentials to device B, in accordance with example embodiments of the invention.
Figure 5B:
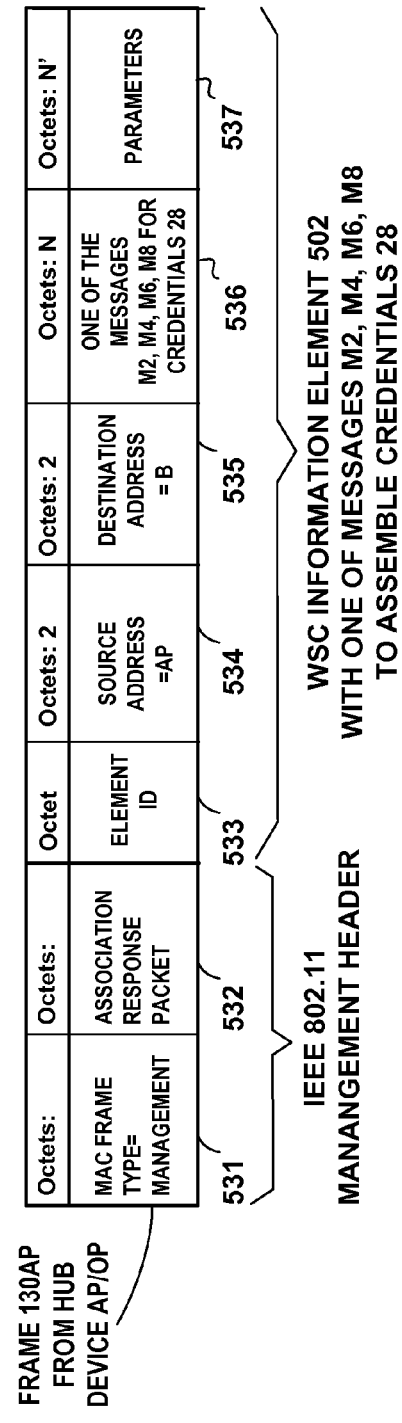
FIG. 5B illustrates one example MAC management frame sent by the hub device AP/GO to the device B with one of the messages M2, M4, M6, and M8 in a WSC information element, used to assemble the network credentials in device B, according to an embodiment of the present invention.

FIG. 1H illustrates an example of the hub device AP/GO recognizing the authentication information 25. The authentication information 25 serves as a proof that the device B did, in fact, engage in an NFC touch with device A. The hub device AP/GO grants network access to device B. Device B connects to the hub device AP/GO and initiates the IEEE 802.1X port-based Network Access Control procedure for port-based authentication. Device B runs the Wi-Fi Simple Configuration EAP method by sending an EAPoL-Start message to the hub device AP/GO. Device B and the hub device AP/GO exchange Registration Protocol messages M1-M8 to provision device B with network credentials for the network. Device B then disassociates and reconnects to the hub device AP/GO, using its new WLAN authentication credentials. FIG. 5B illustrates an example MAC management frame 130AP sent by the hub device AP/GO to the device B with the messages M2, M4, M6, and M8 in WSC information elements 502, used to assemble the credentials 28 in device B.

Figure 1I:
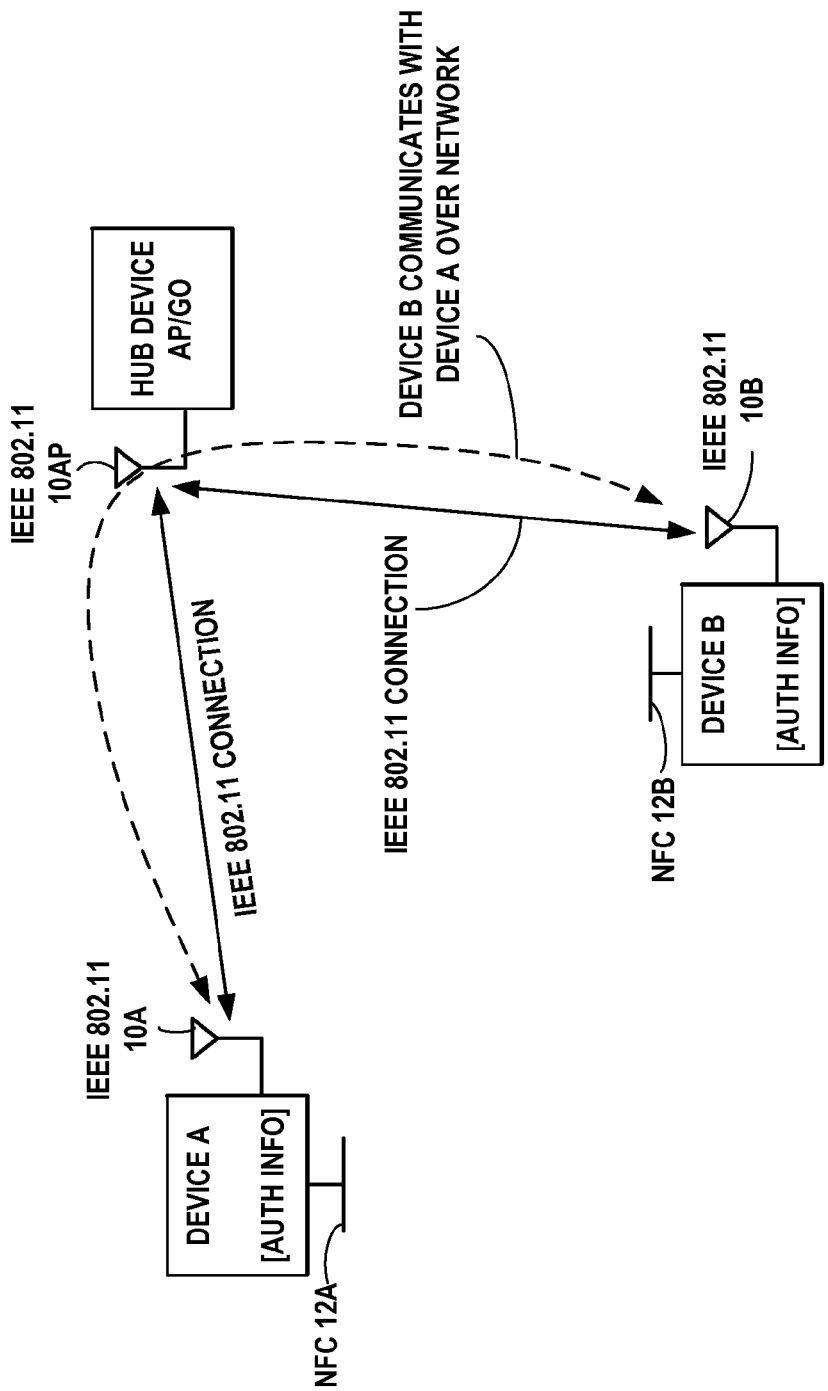
FIG. 1I illustrates the example network diagram of FIG. 1G, wherein device B is now connected to the network with its new configuration and may communicate with device A over the network, through the hub device AP/GO, in accordance with example embodiments of the invention.

FIG. 1I illustrates an example of device B now connected to the network with its new configuration and may communicate with device A over the network, through the hub device AP/GO. Device B has automatically joined the network that now includes the hub device AP/GO and both client devices, device A and device B, without requiring the user to type in a PIN number.

Figure 1J:
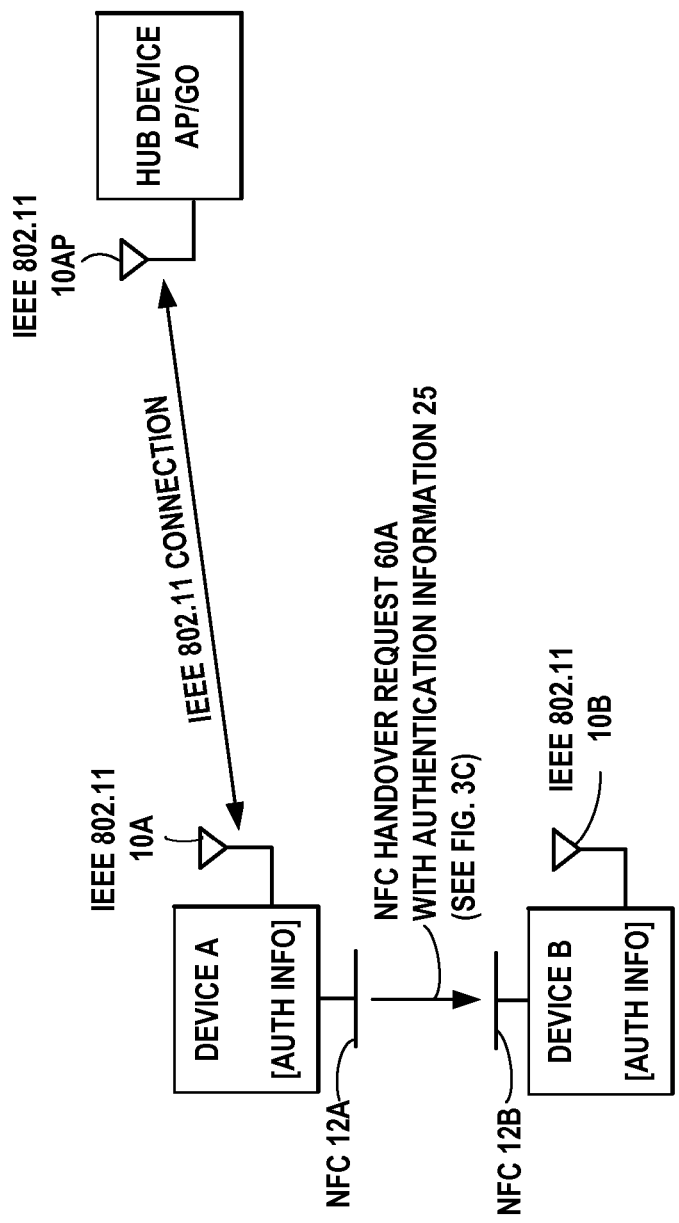
FIG. 1J illustrates the example network diagram of FIG. 1D, of an alternate example wherein device A transmits to device B an NFC handover request that includes the authentication information that is recognizable by the hub device AP/GO and connection information, in accordance with example embodiments of the invention.
Figure 3C:
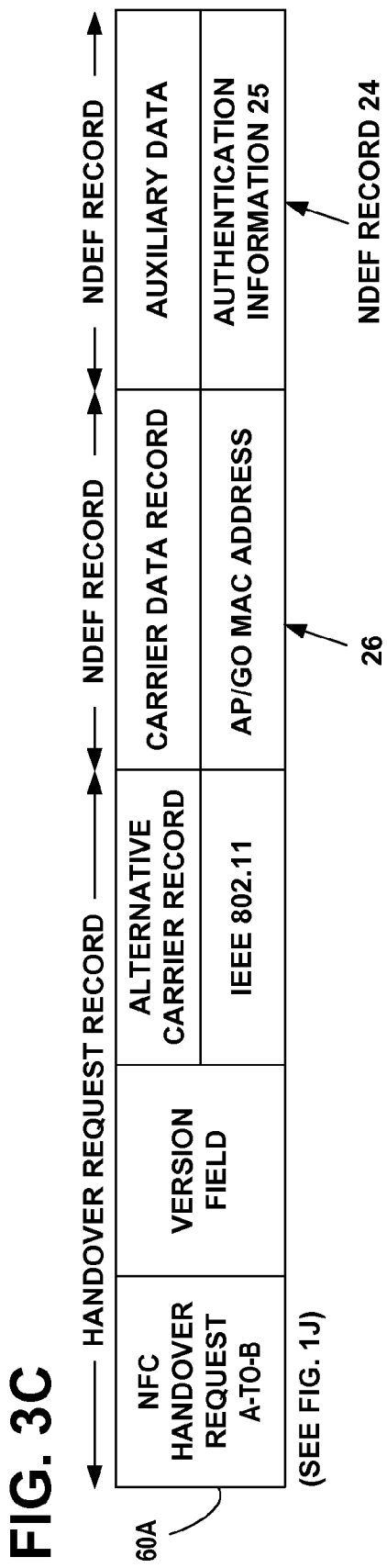
FIG. 3C is an example alternate embodiment of one example an NFC handover request message sent from device A to device B, as shown in FIG. 1J, to provide connectivity settings and the authentication information recognizable by the hub device AP/GO, to obtain network access through the hub device AP/GO, according to an embodiment of the present invention.

FIG. 1J illustrates the example network diagram of FIG. 1D, of an alternate example wherein device A transmits to device B an NFC handover request 60A, as shown in FIG. 3C, which includes the authentication information 25 that is recognizable by the hub device AP/GO and connection information 26, in accordance with example embodiments of the invention.

In an example alternate embodiment, the device B may generate its own random number as an authentication information 25 and send it to device A via the NFC touch procedure. Device A would then transmit the random number to the hub device AP/GO via the IEEE 802.11 in-band short-range carrier communication connection, so that the authentication information 25 is recognizable by the hub device AP/GO, which will serve as a proof that the device B did, in fact, engage in an NFC touch with device A.

In alternate example embodiments of the invention, RFID transponders may be used in devices A and B, which may be the passive type or the active type. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with the wireless device A and B and the user brings the RFID transponder on the device A close to an RFID reader circuit in device B to allow near field communication between the devices. In example embodiments, both devices A and B have RFID reader circuits to read RFID signals from the other device.

Figure 2:
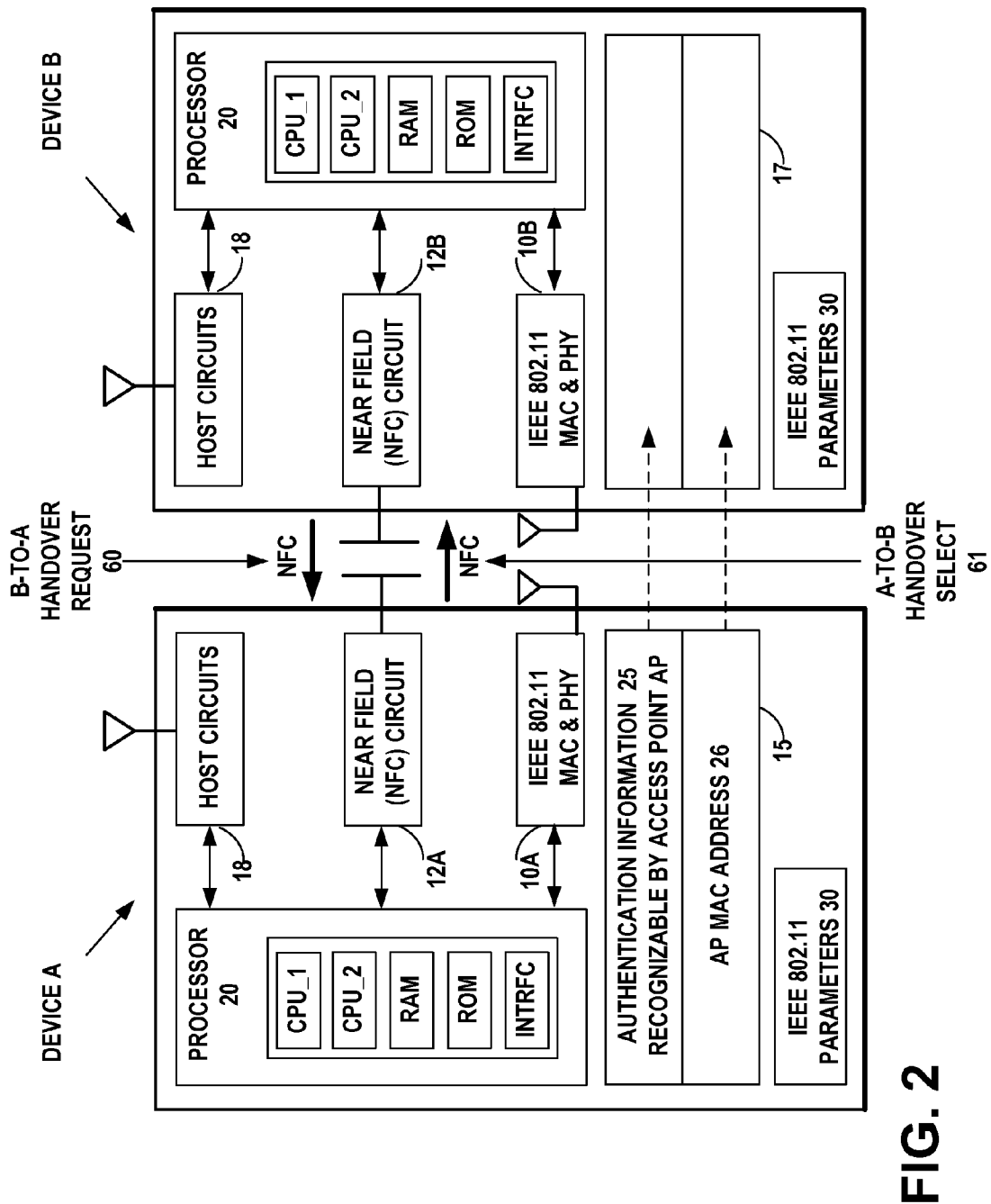
FIG. 2 is an example functional block diagram of device A and device B of FIG. 1A, showing each device equipped an out-of-band NFC transceiver and an in-band short-range carrier transceiver, in accordance with example embodiments of the invention.
Figure 4:
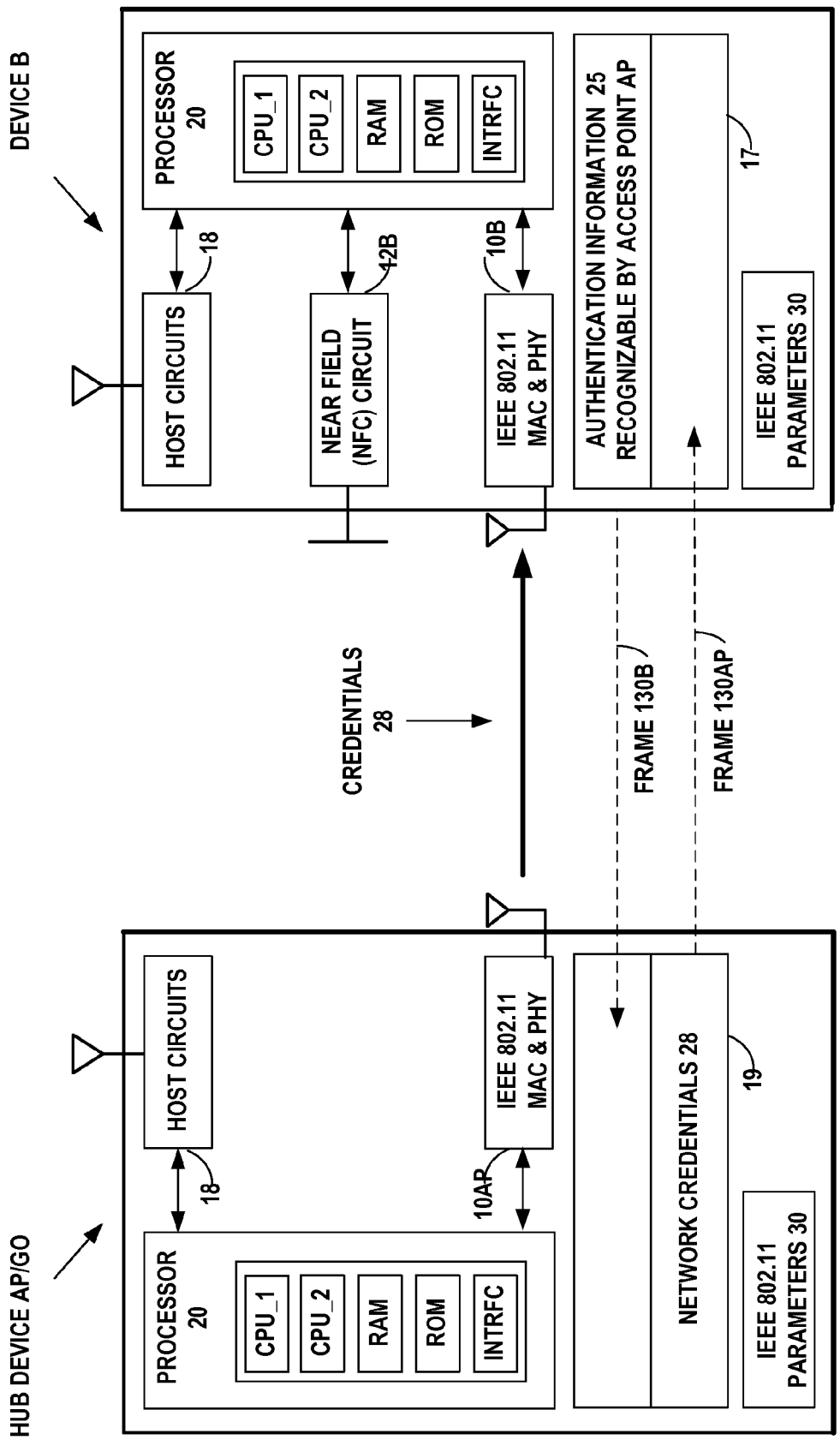
FIG. 4 is an example functional block diagram of device B and the hub device AP/GO of FIG. 1A, where device B sends the authentication information to the hub device AP/GO, which will serve as a proof that the device B did, in fact, engage in an NFC touch with device A, and in response the hub device AP/GO sends network credentials to device B, according to an embodiment of the present invention.

FIG. 2 is a wireless network diagram of an example embodiment of wireless device A and wireless device B. The device A and device B are each equipped an out-of-band NFC transceiver 12A and 12B, respectively, using the Near Field Communication (NFC) protocol. The device A and device B of FIG. 2 and hub device AP/GO of FIG. 4, are each equipped with one or more in-band short-range carrier transceivers, for example the in-band short range transceiver 10A, 10B, and 10C, respectively, that use the IEEE 802.11 protocol. The NFC protocol is out-of-band from the point of view of the in-band IEEE 802.11 protocol.

In an example embodiment, device A and device B of FIG. 2 and hub device AP/GO of FIG. 4, may each be a host device having an overall function as a PDA, cell phone, laptop or palmtop computer, or the like. The device A and device B of FIG. 2 and hub device AP/GO of FIG. 4, each include a processor 20 that includes a dual core or multi-core central processing unit (CPU_1 and CPU_2), a random access memory (RAM), a read only memory (ROM), and interface circuits to interface with host circuits 18, such as a cell phone radio, a battery and other power sources, key pad, touch screen, display, microphone, speakers, ear pieces, camera or other imaging devices, etc. in the device A and device B. The RAM and ROM may be removable memory devices such as smart cards, SIMs, WIMs, semiconductor memories such as RAM, ROM, PROMS, flash memory devices, etc. The IEEE 802.11 MAC and PHY 10A, 10B, and 10C, provide the medium access control and radio for IEEE 802.11 WLAN communications. The device A and device B have similar components.

The IEEE 802.11 MAC and PHY 10A of device A of FIG. 2 may receive authentication information 25 from the hub device AP/GO of FIG. 4 and buffer it in an input/output buffer 15. The authentication information 25 may include, for example, a random number or a value based on public key encryption. The MAC address of the hub device AP/GO may also be buffered in the input/output buffer 15 of device A.

Each NFC circuit 12A in device A and NFC circuit 12B in device B, which use in the Wi-Fi Protected Setup (WPS) standard, communicates bi-directionally with the other NFC circuit 12A or 12B via magnetic field induction, where two loop antennas are located within each other's near field, effectively energizing a wireless contact by forming an air-core transformer. An example NFC radio of NFC circuit 12A or 12B operates within the unlicensed radio frequency ISM band of 13.56 MHz, with a bandwidth of approximately 2 MHz over a typical distance of a few centimeters. The NFC circuit 12A or 12B may be affixed to or an integral part of device A and device B and the user brings the NFC radio on the device close to the other NFC circuit 12A or 12 B of the other device to allow near field, bidirectional communication between the devices.

The IEEE 802.11 parameters 30 of device A and device B of FIG. 2 and hub device AP/GO of FIG. 4, may include the wireless LAN parameters and credentials information for the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros).

The Wi-Fi Protected Setup programmed instructions may be stored in the memory device A, device B, and hub device AP/GO, based on the *Wi-Fi Simple Configuration Specification*, Version 2.0, to enable setting up a device-to-device WLAN network with a second wireless device, using near-field communication signals in the out-of-band device-to-device connection setup. Also included in the memory device A, device B, and hub device AP/GO, is the Wi-Fi Direct Peer-to-Peer protocol program, based on the *Wi-Fi Alliance Peer-to-Peer Specification*, for P2P networks. The programmed instructions may be implemented as software, firmware, hardware or any combination thereof.

Also included in device A and device B are the Wi-Fi Protected Setup (WPS) 2.0 specification programmed instructions for NFC, including the Connection Handover specified for Infrastructure WLAN setup, Password Token (tag) for Infrastructure WLAN setup, and Configuration Token (tag) for Infrastructure WLAN setup. Also included in the memory of device A and device B are programmed instructions for the NFC Connection Handover protocol, based on the *NFC Connection Handover Technical Specification*. The programmed instructions may be implemented as software, firmware, hardware or any combination thereof.

In example embodiments of the invention, hub device AP/GO may also be equipped with an out-of-band NFC transceiver and an implementation supporting the Near Field Communication (NFC) protocol.

The IEEE MAC 10A, 10B, and 10C, IEEE 802.11 parameters 30, Wi-Fi Protected Setup Program, Wi-Fi Direct Peer-to-Peer protocol program, and NFC Connection Handover program may be embodied as program logic stored in the RAM and/or ROM in the form of sequences of programmed instructions which, when executed in the CPU, carry out the functions of the disclosed embodiments. The program logic can be delivered to the writeable RAM, PROMS, flash memory devices, etc. of the device A, device B, and hub device AP/GO from a computer program product or article of manufacture in the form of computer-usable media such as resident memory devices, smart cards or other removable memory devices. Alternately, they can be embodied as integrated circuit logic in the form of programmed logic arrays or custom designed application specific integrated circuits (ASIC). The one or more PHY radios in the device A, device B, and hub device AP/GO may be separate transceiver circuits or alternately, the one or more radios may be a single RF module capable of handling one or multiple channels in a high speed, time and frequency multiplexed manner in response to the processor 20. Device A, device B, and hub device AP/GO may have the same or similar components.

When the user brings the two NFC equipped devices A and B into close proximity, as shown in FIGS. 1A and 1B, they may establish an NFC communication link based on the NFC Forum Logical Link Control Protocol (LLCP) specification. In this example, it is be the user's intention to have device B activate a different wireless communication protocol, such as the IEEE 802.11 WLAN protocol, in order to enable device B to obtain network access through the hub device AP/GO and join the existing infrastructure network or P2P network, of which device A is a member. Device B may use the NFC Forum Connection Handover protocol to request from device A, information to enable device B to obtain network access through the hub device AP/GO.

Device A is shown in FIGS. 1A and 1B initiating an out-of-band NFC connection handover with device B by the NFC transceiver 12A transmitting wireless communication signals for providing the NFC communication connection. When the NFC selector device A has established LLCP communication with the NFC requestor device B, the requestor device B sends in FIG. 1E, a handover request message 60, shown in FIG. 3A, to device A, with its request for information to enable device B to obtain network access through the hub device AP/GO.

The NFC selector device A then responds by sending to device B in FIG. 1F, a handover select message 61, shown in FIG. 3B, including the authentication information 25 and connection information, such as the MAC address 26 of the hub device AP/GO, to carry out a connection setup between device B and the hub device AP/GO. The handover select message 61 includes the authentication information 25 and the MAC address 26 of the hub device AP/GO that are output from the input/output buffer 15 of device A. Device B of FIG. 2 may receive authentication information 25 and MAC address 26 of the hub device AP/GO, which may be buffered in the input/output buffer 17 of device B.

FIG. 3A is one example embodiment of an NFC handover request message 60 format from the device B to the device A with a request for information to enable device B to obtain network access through the hub device AP/GO, in the NDEF record, sent by the requestor over the NFC link, according to an embodiment of the present invention. A new NDEF record is added to carry the request. NDEF messages enable a handover requester B to negotiate with the handover selector A over the NFC link.

The handover request message 60 is composed of a handover request record that identifies the version of the handover specification being used, and the alternative carrier record that identifies the target carrier type to which that handover is directed, such as a handover from the NFC link to an IEEE 802.11 WLAN link. The handover request record may have a plurality of alternative carrier records, one for each of a plurality of possible target carriers. The handover request record is followed by several NDEF records. Each alternative carrier record in the handover request record includes pointers to related NDEF records. The first NDEF record pointed to by an alternative carrier record contains carrier configuration characterizing the intended target carrier, such as IEEE 802.11. The following NDEF record pointed to by the alternative carrier record contains auxiliary data associated with the intended target carrier or other information related to the handover to the target carrier.

FIG. 3B is one example embodiment of an NFC handover select message 61 sent from the selector device A to the requester device B. NFC handover select messages 61 may be similarly constructed as are the handover request messages 60. A new NDEF record may added to carry the additional information needed to either acknowledge the request, provide connectivity settings for the device B and the authentication information 25, or to respond with an alternate proposal for the connection, sent by the selector A over the NFC link, according to an embodiment of the present invention.

The authentication information 25 is recognizable by the hub device AP/GO, which will serve as a proof that the device B did, in fact, engage in an NFC touch with device A. The authentication information 25 may include, for example, a random number or a value based on public key encryption that was previously received by device A as the authentication information 25 from the hub device AP/GO, via the IEEE 802.11 in-band short-range carrier communication connection.

The following Table 2 shows an example NDEF record 24 that includes the authentication information 25 carried in the NDEF record of the NFC handover select message 61 of FIG. 3B.

TABLE 2

NDEF Record 24

| Attribute | R/O | Notes, Allowed Values |
|---|---|---|
| SSID | R | SSID of network. |
| Network Type | R | <information whether it is Infra or Wi-Fi Direct network> |
| Client MAC Address | R | MAC address of the Client <may be needed for security reasons> |
| AP/GO MAC Address | R | MAC address of the AP/GO |
| Channel | O | <This would shorten delay because right channel is then not needed to search> |
| <Supported WPS methods by AP/GO> | O | <This is useful to optimize needed user interactions in second WPS procedure> |
| <other AP/GO device identity information> | O | <user may be difficult identify right device based on just MAC address. So some more user friendly information would be useful, like device type, manufacturer name, user friendly device name, device model . . . Note: This is problem especially in NFC method and Wi-Fi Direct.> |
| <Client Device state> | O | <some kind state information of touched Client device, in simplest this could be just define that device is 'Client'. Also more detailed information could be useful> |
| <other Client identity information> | O | <Device Name, UUID (in case of UPnP/DLNA), IP address or such identity of the touched Client device, see *)> |
| <basic Client capability information> | O | <for example supported Wi-Fi modes, capability to do another Wi-Fi connection, see **> |
| <other . . .> | O | Multiple attributes are permitted. |

The operation of touching the device A to the device B is typically made because of a desire for them to communicate. Thus, the MAC address in the example record is useful information. Other identity information may also be useful to help reduce delays in connection setup.

If both devices that are touched together are client devices of the different networks, then the information in the example record may be used to decide which one of the devices may have an better route to access other device's network, for example in creating parallel connections.

It may be possible that both touching devices are already members of the same network. In this case the example record may be used to detect that situation and the devices may continue using their current connections for communication between each other.

Typically, NFC touch is 'blind', meaning that there is no prior in-band WLAN communication between the touched devices. However, at least in the infrastructure case 'touch during in-band' signaling is also supported, but the information for the NFC record may differ.

In the blind touch case, touching devices do not have any prior information of each other, and thus all relevant information is needed to carry over the NFC link to enable further WLAN in-band communication.

FIG. 3C is an example alternate embodiment of one example an NFC handover request message 60A sent from device A to device B, as shown in FIG. 1J, to provide connectivity settings 26 and the authentication information 25 recognizable by the hub device AP/GO, to obtain network access through the hub device AP/GO, according to an embodiment of the present invention.

FIG. 4 is a wireless network diagram of an example embodiment of device B and hub device AP/GO. The device B and hub device AP/GO are each equipped with one or more in-band short-range carrier transceivers, for example the in-band short range transceiver 10B and 10C, respectively, that use the IEEE 802.11 protocol. After the NFC touch procedure, device B possesses the authentication information 25 recognizable by the hub device AP/GO, in its input/output buffer 17, which will serve as a proof that the device B did, in fact, engage in an NFC touch with device A.

Device B issues a request frame, for example a probe request frame 130B with a Wi-Fi Protected Setup (WSC) information element (IE) of FIG. 5A, sending it to the hub device AP/GO in a Wi-Fi Protected Setup procedure. The WSC information element (IE) of FIG. 5A may include the authentication information 25 recognizable by the hub device AP/GO. The WSC information element (IE) includes the authentication information 25 that was output from the input/output buffer 17 of device B. The hub device AP/GO of FIG. 4 may receive authentication information 25, which may be buffered in the input/output buffer 19 of the hub device AP/GO.

The hub device AP/GO will recognize the authentication information 25, which will serve as a proof that the device B did, in fact, engage in an NFC touch with device A. In response, hub device AP/GO will grant network access to device B. Device B connects to the hub device AP/GO and initiates the IEEE 802.1X port-based Network Access Control procedure for port-based authentication. Device B runs the Wi-Fi Simple Configuration EAP method by sending an EAPoL-Start message to the hub device AP/GO. Device B and the hub device AP/GO exchange Registration Protocol Messages M1-M8, such as frame 130AP of FIG. 5B, to provision device B with network credentials 28 for the network. An example of the credentials 28 is shown in Table 1, above.

Device B then disassociates and reconnects to the hub device AP/GO, using its new WLAN authentication credentials 28. Device B is now connected to the network with its new configuration and may communicate with device A over the network, through the hub device AP/GO. Device B has automatically joined the network that now includes the hub device AP/GO and both client devices, device A and device B, without requiring the user to type in a PIN number.

FIG. 5A illustrates one example embodiment of an IEEE 802.11 request frame, for example a probe request frame 130B sent by device B to the hub device AP/GO with the authentication information 25 in a WSC information element (IE) 500. The hub device AP/GO responds with its own discovery data in a probe response WSC information element. Then device B connects to the hub device AP/GO and initiates the IEEE 802.1X port-based Network Access Control procedure for port-based authentication. The device B and the hub device AP/GO exchange Registration Protocol Messages M1-M8, such as frame 130AP of FIG. 5B, to provision device B with network credentials 28 for the network in the buffer 17 of device B.

Probe request frame 130B includes an IEEE 802.11 management header that includes MAC frame type 521 indicating it is a management frame. Field 522 identifies the frame 130B as a probe request packet. The payload portion of the Probe request frame 130B includes the WSC information element (IE) 500 that includes an element ID field 523 and the record 24 with authentication information 25 in field 526.

FIG. 5B illustrates one example embodiment of a MAC management frame 130AP sent by the hub device AP/GO to the device B with the messages M2, M4, M6, and M8 in WSC information elements 502, used to assemble the credentials 28 in device B. The response frame 130AP includes an IEEE 802.11 management header that includes MAC frame type 531 indicating it is a management frame. Field 532 identifies the frame 130AP as a association response packet. The payload portion of the response frame 130AP includes the WSC information element (IE) 502 that includes an element ID field 533 and one of messages M2, M4, M6, M8 to assemble credentials 28 in field 536.

Figure 6A:
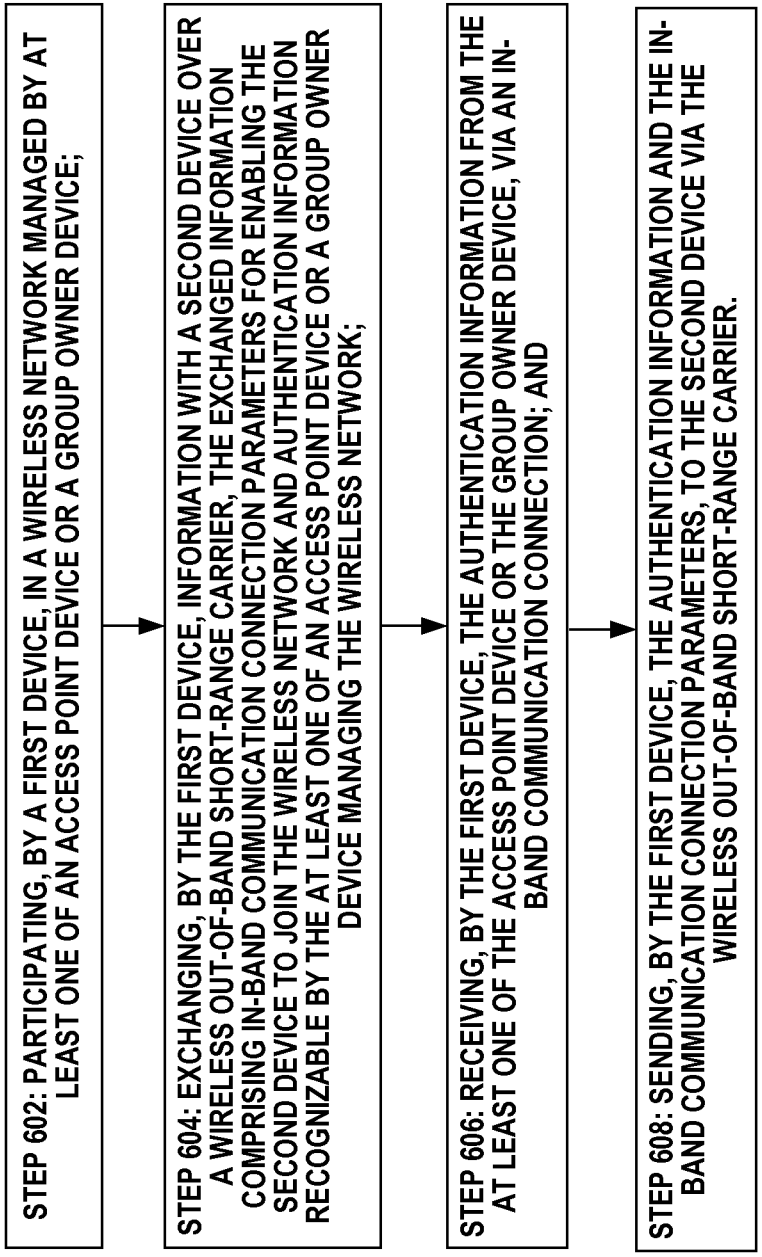
FIG. 6A is an example flow diagram of operational steps of an example embodiment of the method carried out by device A of FIG. 2, according to an embodiment of the present invention.

FIG. 6A is an example flow diagram 600 of example operational steps of an example embodiment of the method carried out between the two wireless devices of FIG. 2, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 602: participating, by a first device, in a wireless network managed by at least one of an access point device or a group owner device;

Step 604: exchanging, by the first device, information with a second device over a wireless out-of-band short-range carrier, the exchanged information comprising in-band communication connection parameters for enabling the second device to join the wireless network and authentication information recognizable by the at least one of an access point device or a group owner device managing the wireless network;

Step 606: receiving, by the first device, the authentication information from the at least one of the access point device or the group owner device, via an in-band communication connection; and Step 608: sending, by the first device, the authentication information and the in-band communication connection parameters, to the second device via the wireless out-of-band short-range carrier.

Figure 6B:
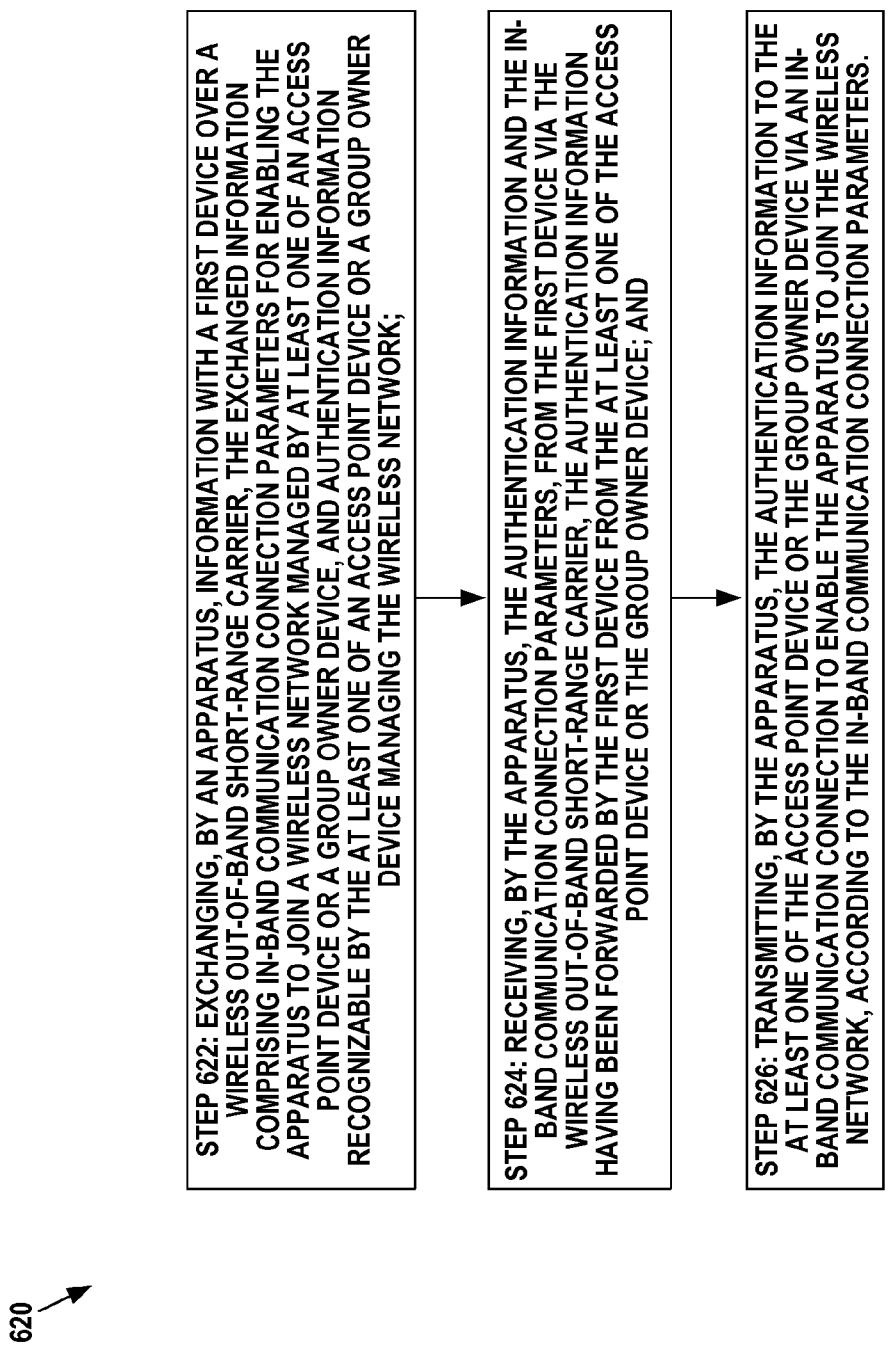
FIG. 6B is an example flow diagram of operational steps of an example embodiment of the method carried out by device B of FIG. 2, according to an embodiment of the present invention.

FIG. 6B is an example flow diagram 620 of example operational steps of an example embodiment of the method carried out between the two wireless devices of FIG. 2, according to an embodiment of the present invention. The steps of the flow diagram represent computer code instructions stored in the RAM and/or ROM memory of the wireless device B, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 622: exchanging, by an apparatus, information with a first device over a wireless out-of-band short-range carrier, the exchanged information comprising in-band communication connection parameters for enabling the apparatus to join a wireless network managed by at least one of an access point device or a group owner device, and authentication information recognizable by the at least one of an access point device or a group owner device managing the wireless network;

Step 624: receiving, by the apparatus, the authentication information and the in-band communication connection parameters, from the first device via the wireless out-of-band short-range carrier, the authentication information having been forwarded by the first device from the at least one of the access point device or the group owner device; and Step 626: transmitting, by the apparatus, the authentication information to the at least one of the access point device or the group owner device via an in-band communication connection to enable the apparatus to join the wireless network, according to the in-band communication connection parameters.

Figure 6C:
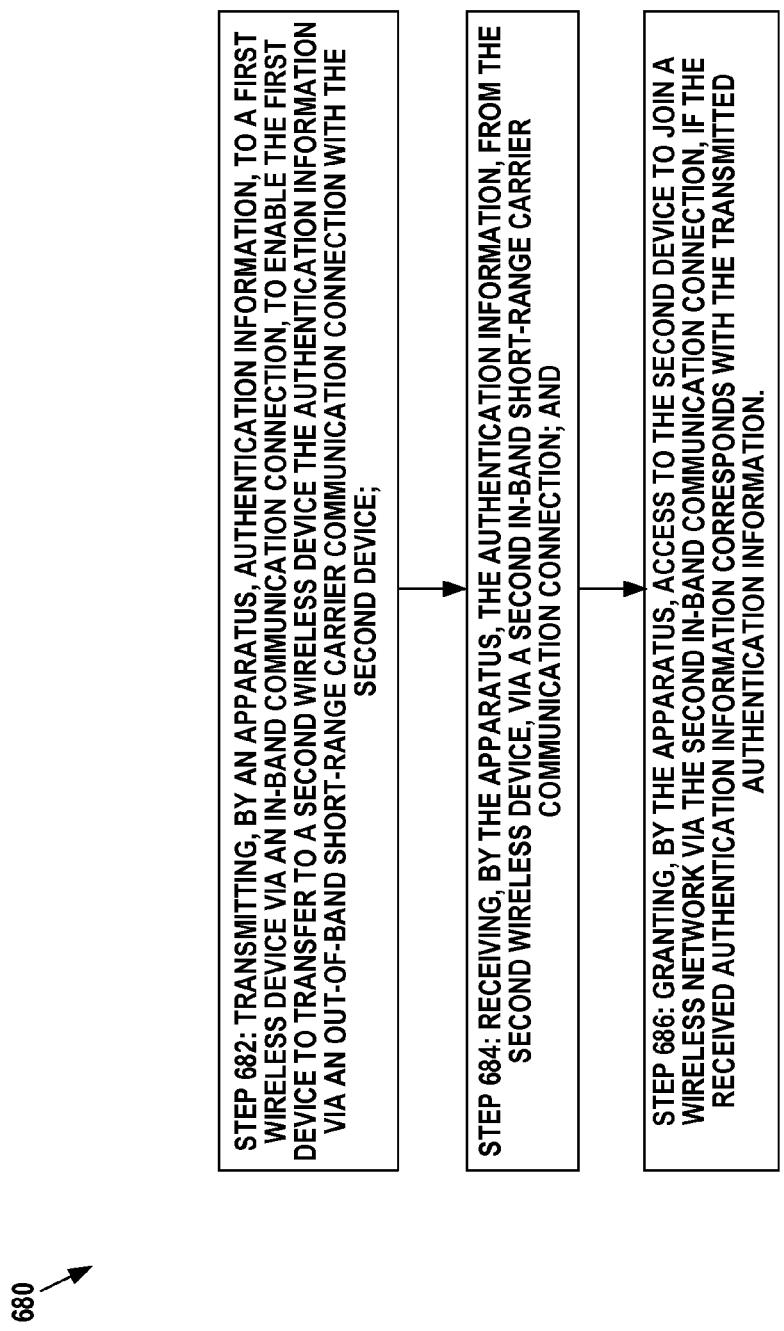
FIG. 6C is an example flow diagram of operational steps of an example embodiment of the method carried out by the hub device AP/GO of FIG. 4, according to an embodiment of the present invention.

FIG. 6C is an example flow diagram 680 of example operational steps of an example embodiment of the method carried out between device A, device B and hub device AP/GO of FIG. 2 and FIG. 4, according to an embodiment of the present invention. The steps of the flow diagram represent computer code instructions stored in the RAM and/or ROM memory of the hub device AP/GO, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 682: transmitting, by an apparatus, authentication information, to a first wireless device via an in-band communication connection, to enable the first device to transfer to a second wireless device the authentication information via an out-of-band short-range carrier communication connection with the second device;

Step 684: receiving, by the apparatus, the authentication information, from the second wireless device, via a second in-band short-range carrier communication connection; and Step 686: granting, by the apparatus, access to the second device to join a wireless network via the second in-band communication connection, if the received authentication information corresponds with the transmitted authentication information.

FIG. 7 is an example sequence diagram of an example embodiment showing the interaction of device A, device B, and the hub device AP/GO of FIG. 1B, according to an embodiment of the present invention. At time T1, hub device AP/GO transmits the authentication information 25 to device A via the IEEE 802.11 in-band short-range carrier communication connection. At time T2, the user of device A touches the NFC transponder of device A to the NFC transponder of device B resulting in an NFC out-of-band short-range carrier communication connection. At time T3, device A sends authentication information 25 to device B via the NFC wireless out-of-band short-range carrier communication connection. At time T4, device B issues a request frame, for example a probe request frame with the authentication information 25 to the hub device AP/GO. At time T5, the hub device AP/GO recognizes the authentication information 25 and grants network access to device B.

In embodiments of the invention, device A may send some non-secure information (MAC address of the AP/GO, Network Name, Channel etc). In addition to this, the authentication information 25 is sent as a 'proof of touch' information over the NFC link. example alternatives for the authentication information 25 include:

1) Random number
   a) Device B generates number, and it is passed over NFC to Device A, and then to AP/GO
   b) AP/GO generates number, and it is forwarded to Device A and then passed over NFC to Device B (Note: Device A may need to have this number in advance because there might not be enough time to query it from AP/GO during touch.
2) Public key based proof; various methods possible, but sending actual public key over NFC might not be feasible (could be too long to carry over NFC).
3) Any other unique information provided by other cryptographic methods available only through the NFC interface, i.e. this information cannot be acquired by merely listening Wi-Fi information sent by AP/GO.

Other cryptographic methods for generation of the authentication information 25 to pass through the NFC interface may include generating a device password (PIN), a 1536-bit Diffie-Hellman key exchange, or a 128-bit Advanced Encryption Standard (AES) symmetric key exchange.

4) Temporary network keys may be used, wherein AP/GO gives temporary key which is valid only certain time (e.g. one Wi-Fi session), thus permission to network access is just temporary.

In the Wi-Fi Direct P2P case, embodiments of the invention provide additional benefits, because the user typically does not know which of the devices is the P2P Group Owner, especially in NFC and push button (PBC) methods. In the PIN case, only Group Owners (GOs) would be displayed to the user, and thus accidental selecting of a client device should not be a problem.

In example alternate embodiments, as shown in FIGS. 8A to 8H, the authentication information 25 for the 'proof of touch' information may be generated by device B and sent over the NFC link to device A. For example a random number may be generated by device B and it is passed over the NFC link via the NFC touch procedure to device A, and then device A transmits the random number to the hub device AP/GO. Device A transmits the random number to the hub device AP/GO via the IEEE 802.11 in-band short-range carrier communication connection, so that the authentication information 25 is recognizable by the hub device AP/GO, which will serve as a proof that the device B did, in fact, engage in an NFC touch with device A.

Figure 8A:
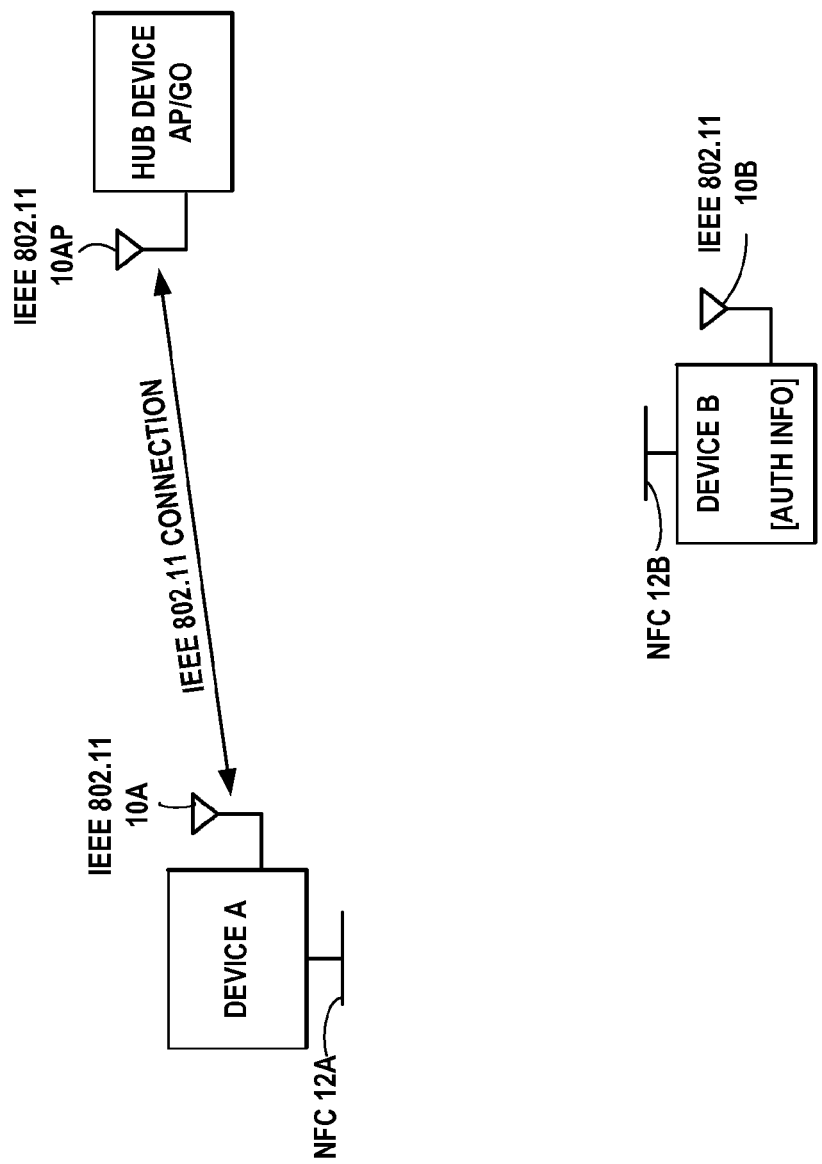
FIG. 8A illustrates the example network diagram of FIG. 1A, wherein device A is shown as having joined a WLAN network by having formed an IEEE 802.11 in-band short-range carrier communication connection with the hub device AP/GO, and the device B is shown having generated the authentication information, in accordance with example embodiments of the invention.

In FIG. 8A, device A is shown as having joined a WLAN network by having formed an IEEE 802.11 in-band short-range carrier communication connection with a hub device AP/GO. The hub device AP/GO represents either an access point device (AP) in an infrastructure network or a group owner (GO) device in a P2P network. Device B is shown having generated the authentication information 25 at any time before or after the establishment of a WLAN network connection between device A and the hub device AP/GO. The authentication information 25 may include, for example, a random number or a value based on public key encryption generated by device B. This random number may be updated periodically.

Figure 8B:
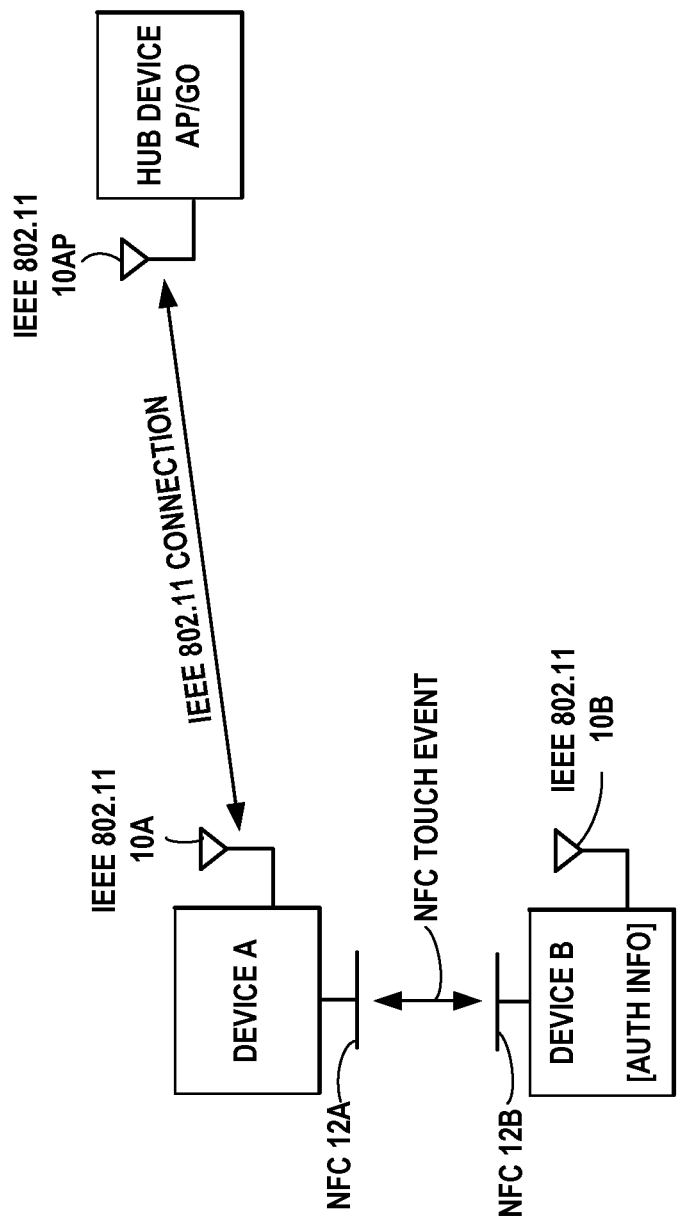
FIG. 8B illustrates the example network diagram of FIG. 8A, an NFC touch event is conducted between devices A and B in order to initiate a short-range carrier transport switch procedure with device B, in accordance with example embodiments of the invention.

FIG. 8B illustrates an NFC touch event between devices A and B. The user of device A would like to include device B in the WLAN network by having it automatically connect to the hub device AP/GO and acquire credentials for network access, without requiring the user to type in a PIN number. To accomplish this, the user of device A touches the NFC transponder of device A to the NFC transponder of device B in order to initiate a short-range carrier transport switch procedure with device B. The NFC touch results in transmitting NFC wireless out-of-band short-range carrier communication signals for providing an NFC out-of-band short-range carrier communication connection with device B.

Figure 8C:
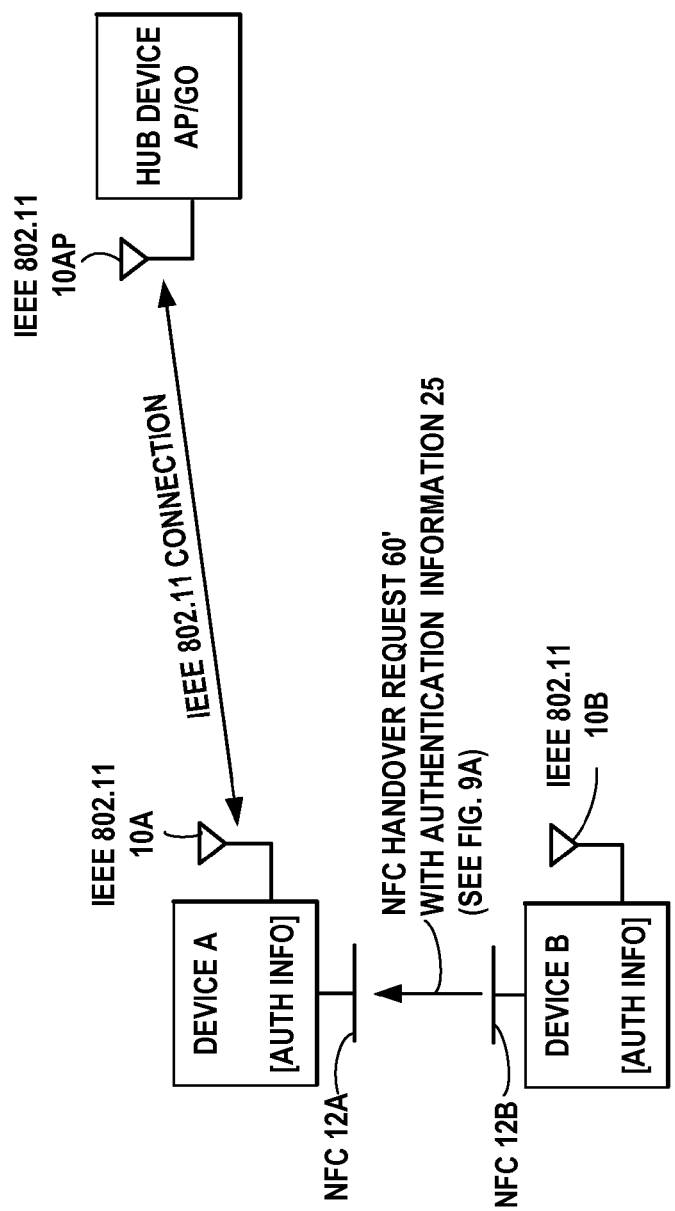
FIG. 8C illustrates the example network diagram of FIG. 8B, one example wherein device B is sending an NFC handover request to device A that includes authentication information, in accordance with example embodiments of the invention.

FIG. 8C illustrates one example device B sending an NFC handover request to device A that includes authentication information 25. When the NFC selector device A has established LLCP communication with the NFC requestor device B, the requestor device B sends a handover request message 60', shown in FIG. 9A, to device A, with its request for information to enable device B to obtain network access through the hub device AP/GO. The NFC handover request message 60' includes NDEF record 24 with the authentication information 25.

Figure 8D:
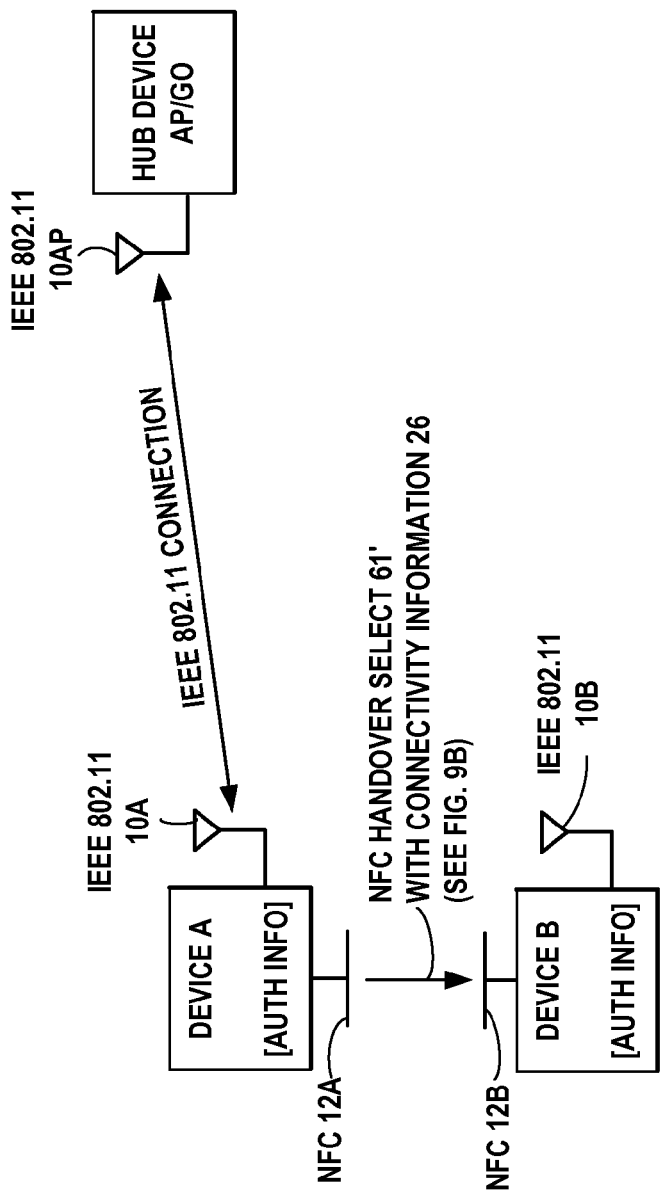
FIG. 8D illustrates the example network diagram of FIG. 8C, one example wherein device A responds with an NFC handover select that includes connection information, in accordance with example embodiments of the invention.

FIG. 8D illustrates one example device A responding with an NFC handover select that includes the connectivity information 26, such as the MAC address for the hub device AP/GO. The NFC selector device A responds by sending to device B, a handover select response message 61', shown in FIG. 9B, including the connectivity information 26, to carry out a connection setup between device B and the hub device AP/GO.

Device A sends to device B, IEEE 802.11 in-band short-range carrier communication connection parameters for connection to the hub device AP/GO, such as the MAC address of the hub device AP/GO, via the NFC out-of-band short-range carrier communication connection. This will enable device B to setup an IEEE 802.11 in-band short-range carrier communication connection with the hub device AP/GO according to the IEEE 802.11 in-band short-range carrier communication connection parameters.

After the NFC touch procedure, device A possesses the authentication information 25 recognizable by the hub device AP/GO, which will serve as a proof that the device B did, in fact, engage in an NFC touch with device A.

Figure 8E:
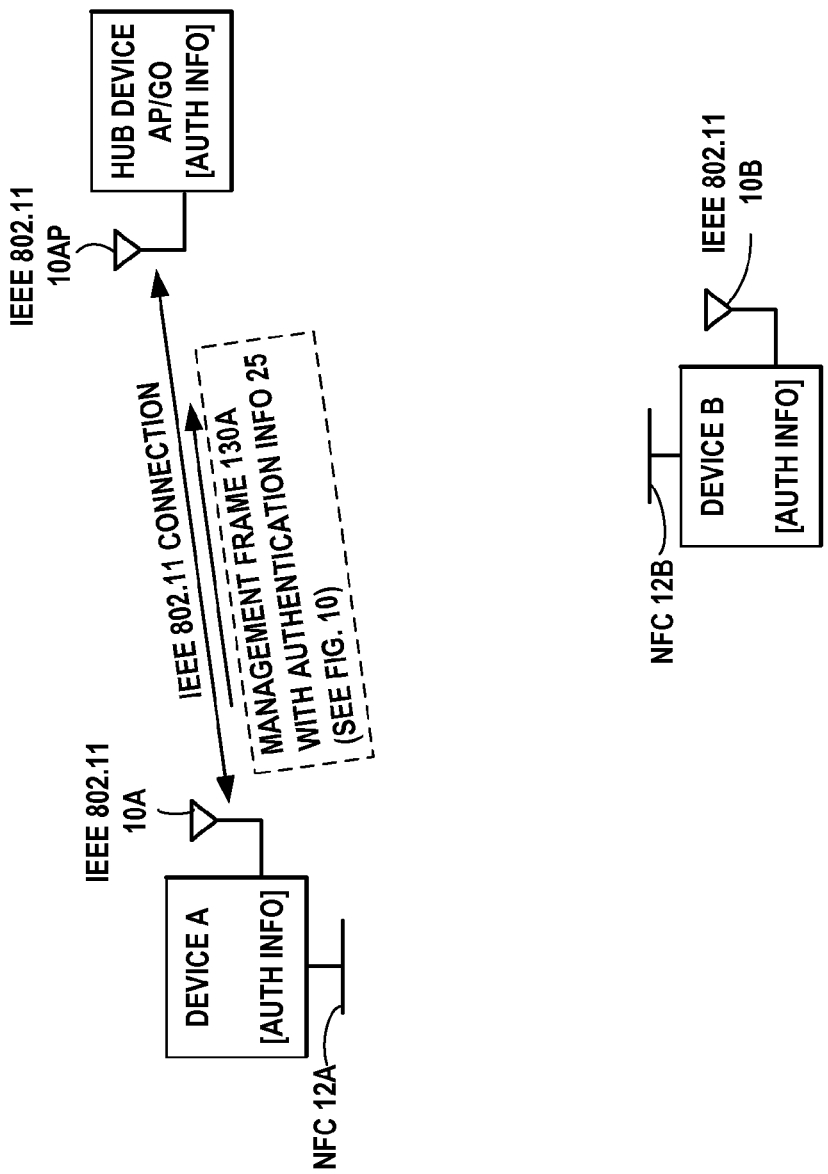
FIG. 8E illustrates the example network diagram of FIG. 8D, one example wherein device A sends a management frame with a Wi-Fi Protected Setup (WSC) information element (IE) to the hub device AP/GO in a Wi-Fi Protected Setup procedure. The WSC information element (IE) of includes the authentication information that will be recognizable by the hub device AP/GO, in accordance with example embodiments of the invention.
Figure 10:
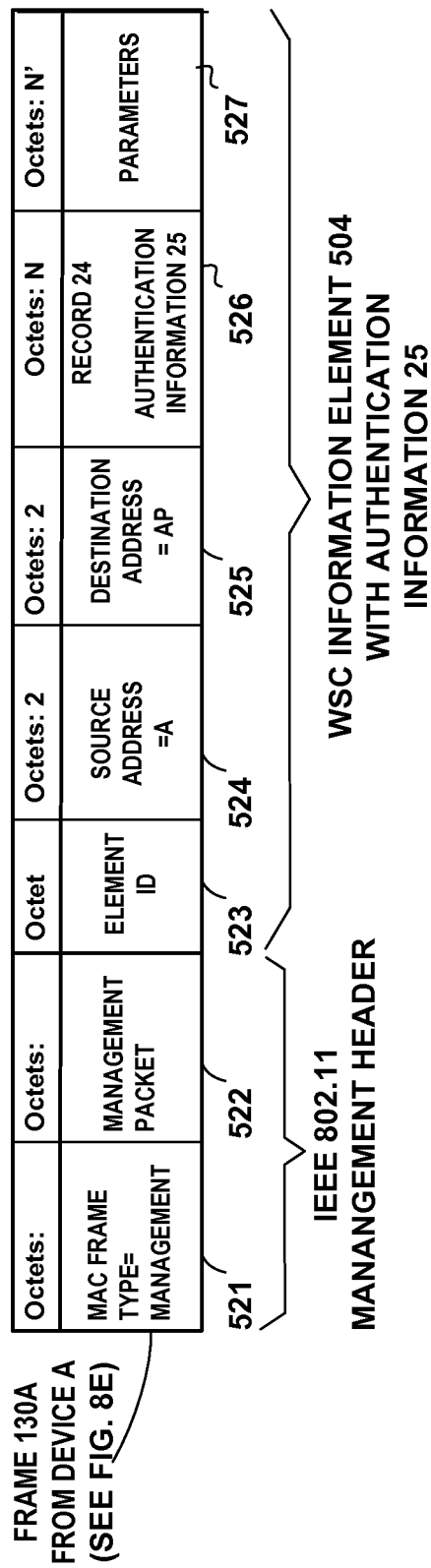
FIG. 10 illustrates one example IEEE 802.11 management frame sent by device A to the hub device AP/GO with the authentication information in a WSC information element, according to an embodiment of the present invention.

FIG. 8E illustrates one example device A sending a management frame 130A with a Wi-Fi Protected Setup (WSC) information element (IE) of FIG. 10, sending it to the hub device AP/GO in a Wi-Fi Protected Setup procedure. The WSC information element (IE) 504 of FIG. 10 includes the authentication information 25 recognizable by the hub device AP/GO.

Figure 8F:
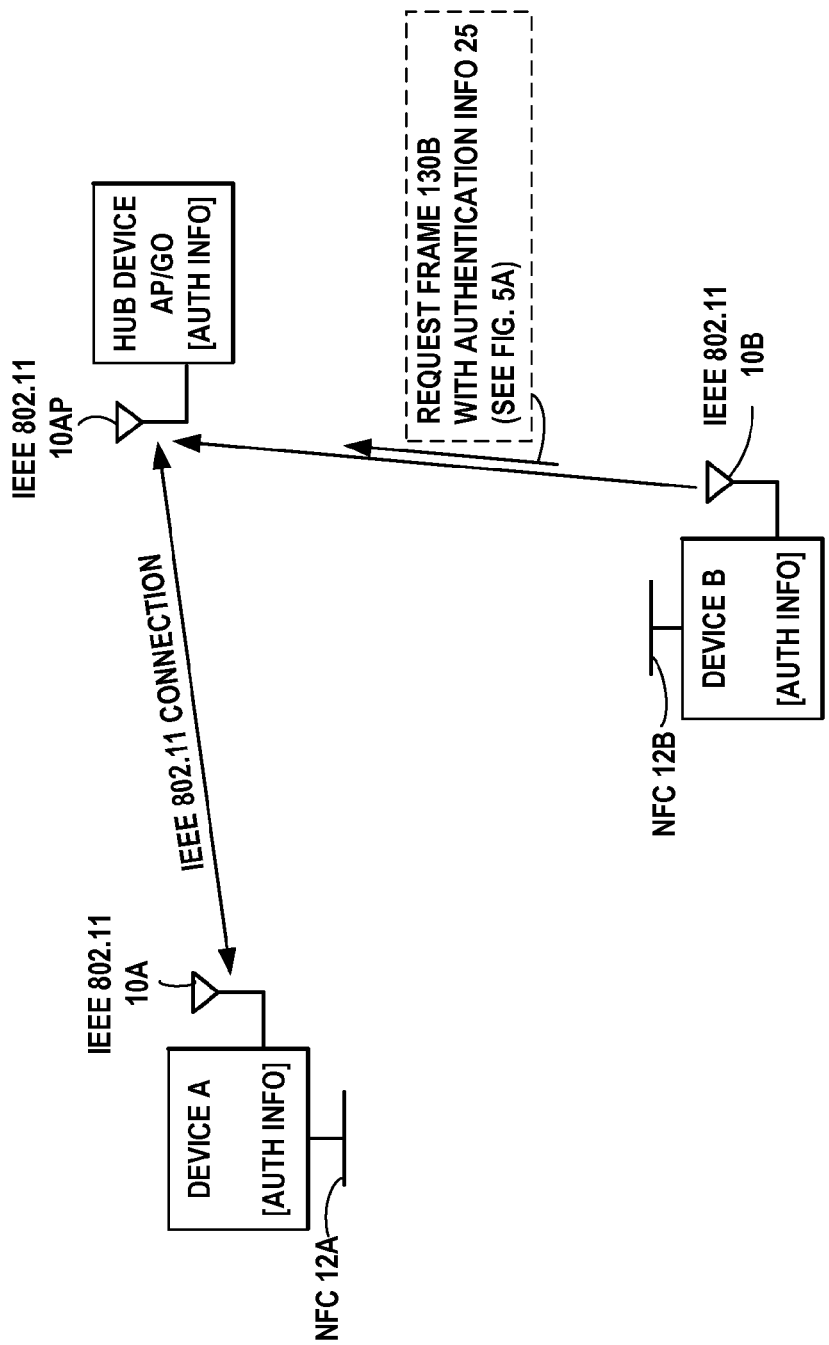
FIG. 8F illustrates the example network diagram of FIG. 8E, one example wherein device B issues a request frame, for example a probe request frame with a Wi-Fi Protected Setup (WSC) information element (IE), sending it to the hub device AP/GO in a Wi-Fi Protected Setup procedure, including the authentication information recognizable by the hub device AP/GO, in accordance with example embodiments of the invention.

FIG. 8F illustrates one example Device B issuing a request frame, for example a probe request frame 130B with a Wi-Fi Protected Setup (WSC) information element (IE) of FIG. 5A, sending it to the hub device AP/GO in a Wi-Fi Protected Setup procedure. The WSC information element (IE) 500 of FIG. 5A includes the authentication information 25 recognizable by the hub device AP/GO.

Figure 8G:
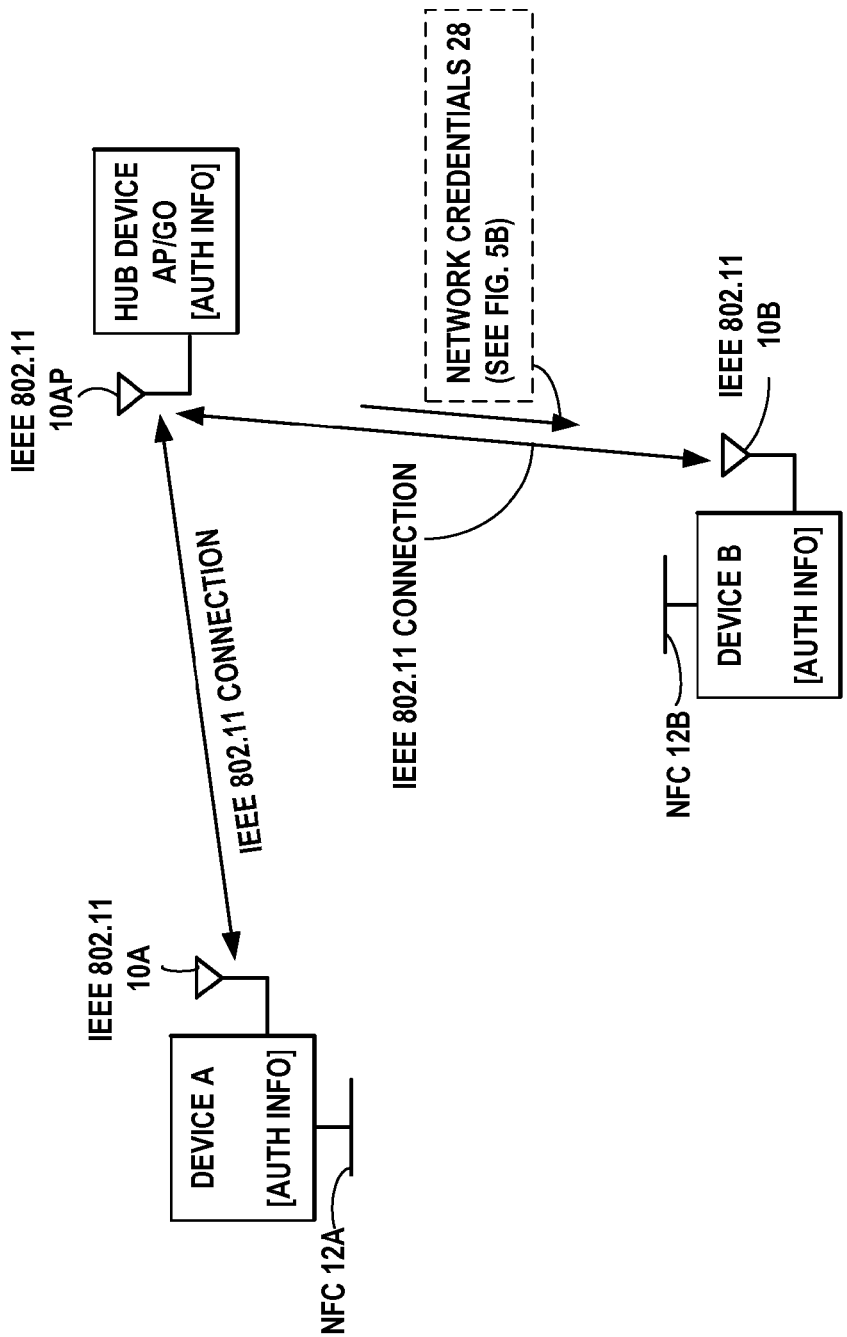
FIG. 8G illustrates the example network diagram of FIG. 8F, wherein the hub device AP/GO recognizes the authentication information that serves as a proof that the device B did, in fact, engage in an NFC touch with device A. The hub device AP/GO grants network access to device B and sends credentials to device B, in accordance with example embodiments of the invention.

FIG. 8G illustrates the hub device AP/GO recognizing the authentication information 25. The authentication information 25 serves as a proof that the device B did, in fact, engage in an NFC touch with device A. The hub device AP/GO grants network access to device B. Device B connects to the hub device AP/GO and initiates the IEEE 802.1X port-based Network Access Control procedure for port-based authentication. Device B runs the Wi-Fi Simple Configuration EAP method by sending an EAPoL-Start message to the hub device AP/GO. Device B and the hub device AP/GO exchange Registration Protocol messages M1-M8 to provision device B with network credentials for the network. Device B then disassociates and reconnects to the hub device AP/GO, using its new WLAN authentication credentials. FIG. 5B illustrates an example MAC management frame 130AP sent by the hub device AP/GO to the device B with the messages M2, M4, M6, and M8 in WSC information elements 502, used to assemble the credentials 28 in device B.

Figure 8H:
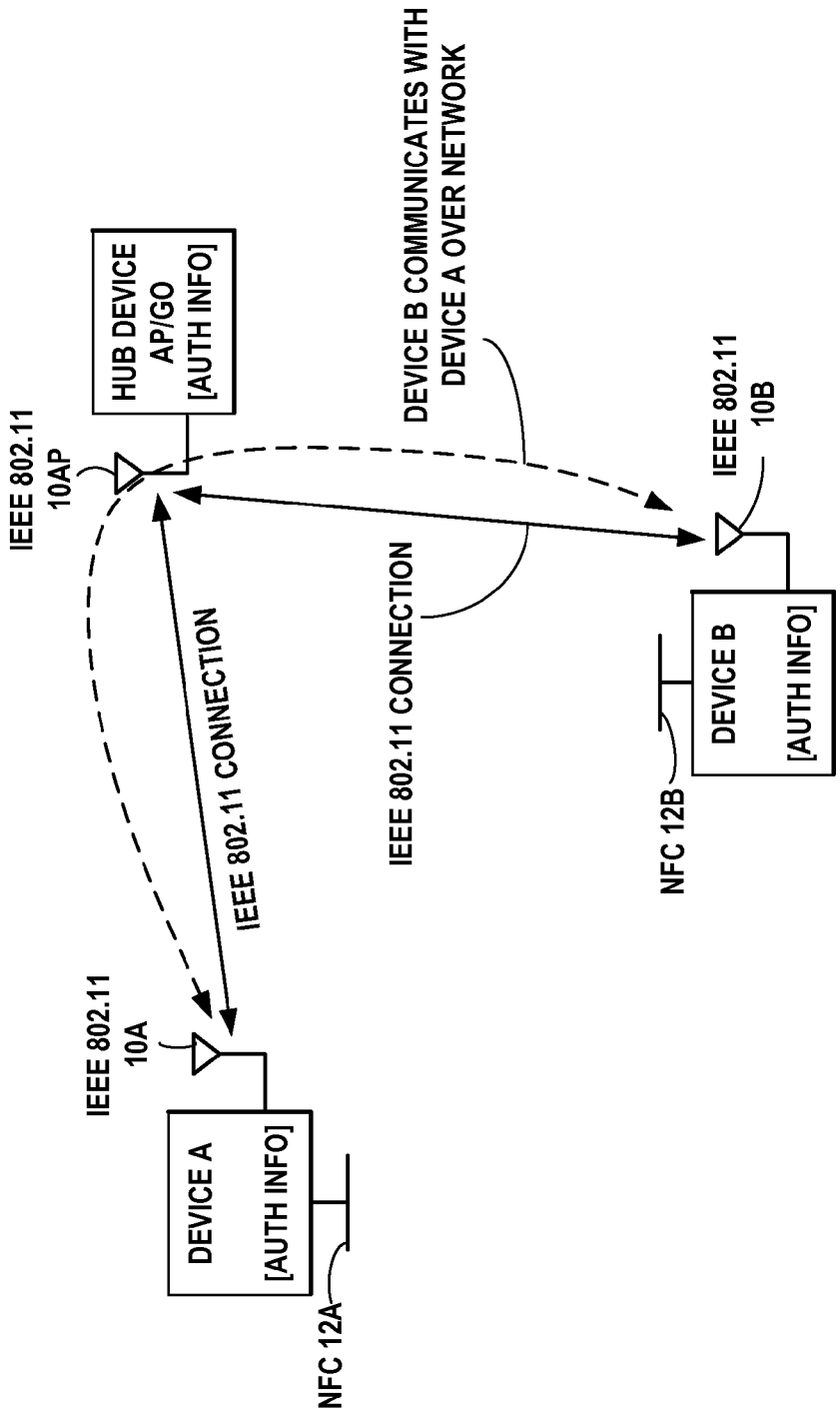
FIG. 8H illustrates the example network diagram of FIG. 8G, wherein device B is now connected to the network with its new configuration and may communicate with device A over the network, through the hub device AP/GO, in accordance with example embodiments of the invention.

FIG. 8H illustrates device B is now connected to the network with its new configuration and may communicate with device A over the network, through the hub device AP/GO. Device B has automatically joined the network that now includes the hub device AP/GO and both client devices, device A and device B, without requiring the user to type in a PIN number.

Figure 8I:
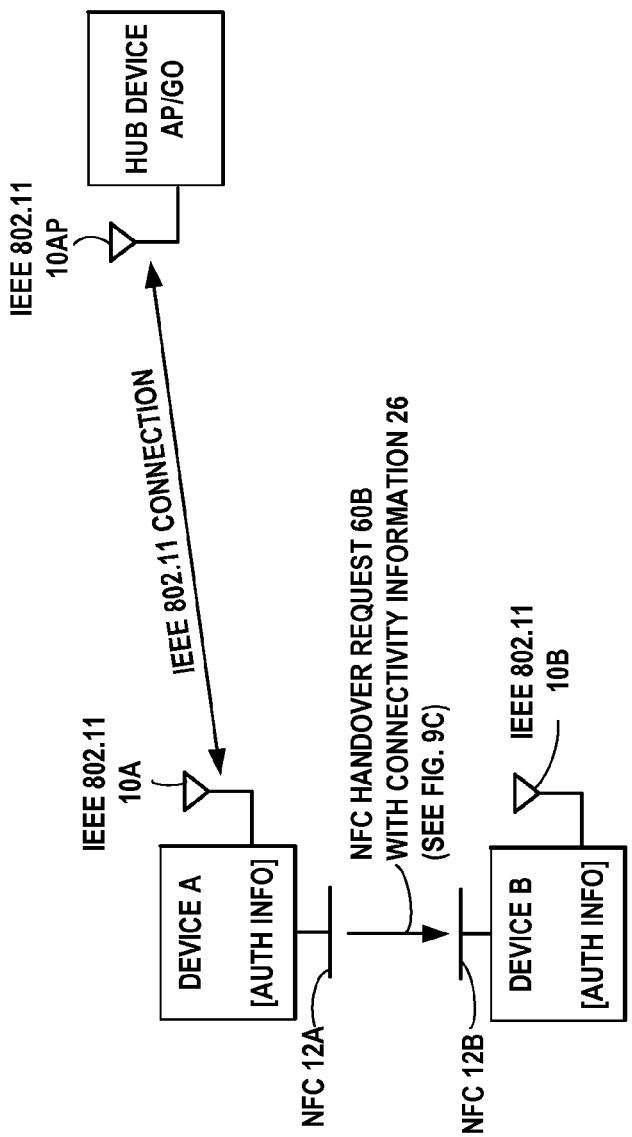
FIG. 8I illustrates the example network diagram of FIG. 8B, of an alternate example wherein device A transmits an NFC handover request that includes connection information, in accordance with example embodiments of the invention.
Figure 9C:
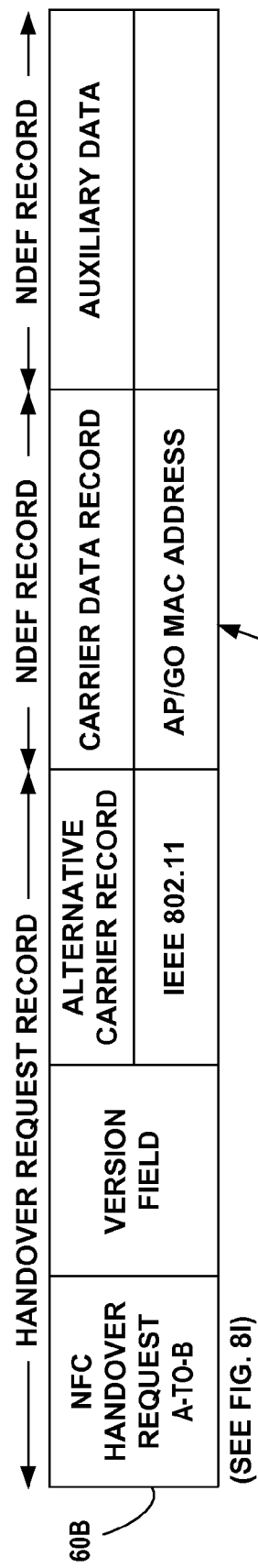
FIG. 9C is an alternate example embodiment an NFC handover request message sent from device A to device B in FIG. 8I, to provide connectivity settings to obtain network access through the hub device AP/GO, according to an embodiment of the present invention.

FIG. 8I illustrates the example network diagram of FIG. 8B, of an alternate example wherein device A transmits an NFC handover request 60B, shown in FIG. 9C, which includes connection information 26, in accordance with example embodiments of the invention.

Figure 8J:
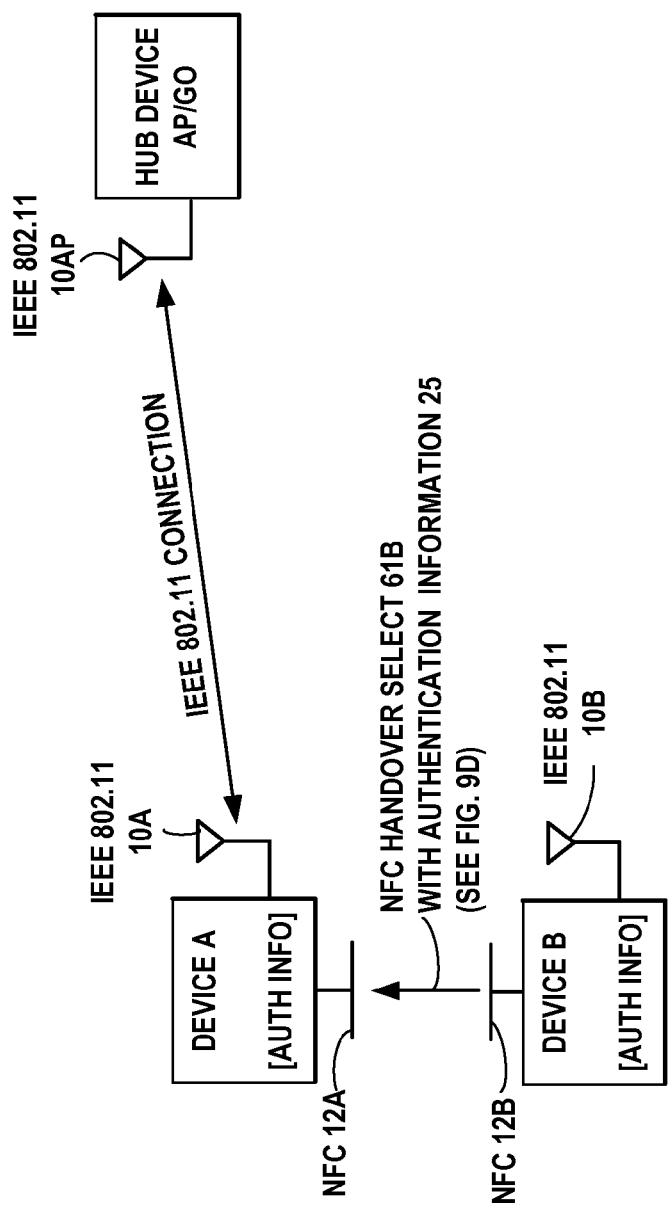
FIG. 8J illustrates the example network diagram of FIG. 8I, of an alternate example wherein device B is responding with an NFC handover select to device A that includes authentication information, in accordance with example embodiments of the invention.
Figure 9D:
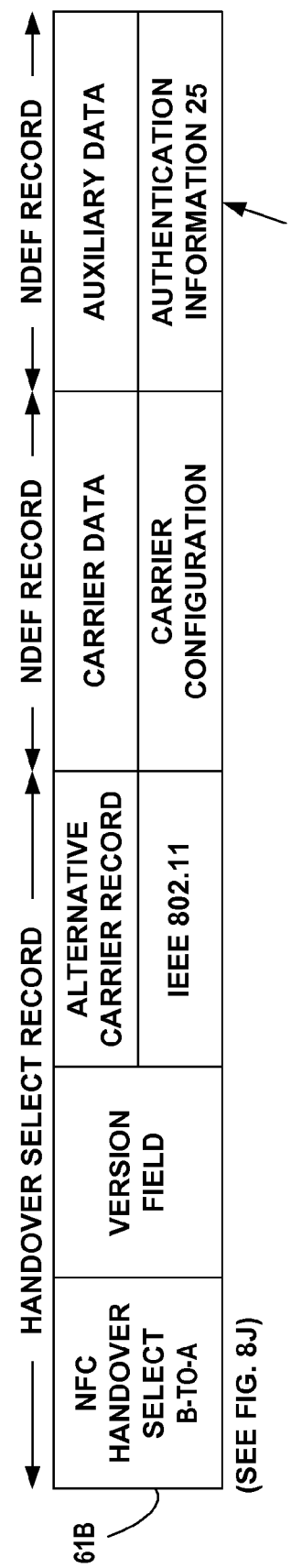
FIG. 9D is an alternate example embodiment of an NFC handover select message sent from the device B to the device A in FIG. 8J, including the authentication information, to enable device B to obtain network access through the hub device AP/GO, in accordance with example embodiments of the invention.

FIG. 8J illustrates the example network diagram of FIG. 8I, of an alternate example wherein device B is responding with an NFC handover select 61B, shown in FIG. 9D, to device A, which includes authentication information 25, in accordance with example embodiments of the invention.

FIG. 9C is an alternate example embodiment of an NFC handover request message 60B sent from device A to device B in FIG. 8I, to provide connectivity settings 26 to obtain network access through the hub device AP/GO, according to an embodiment of the present invention.

FIG. 9D is an alternate example embodiment of an NFC handover select message 61B sent from the device B to the device A in FIG. 8J, including the authentication information 25, to enable device B to obtain network access through the hub device AP/GO, in accordance with example embodiments of the invention.

Figure 11A:
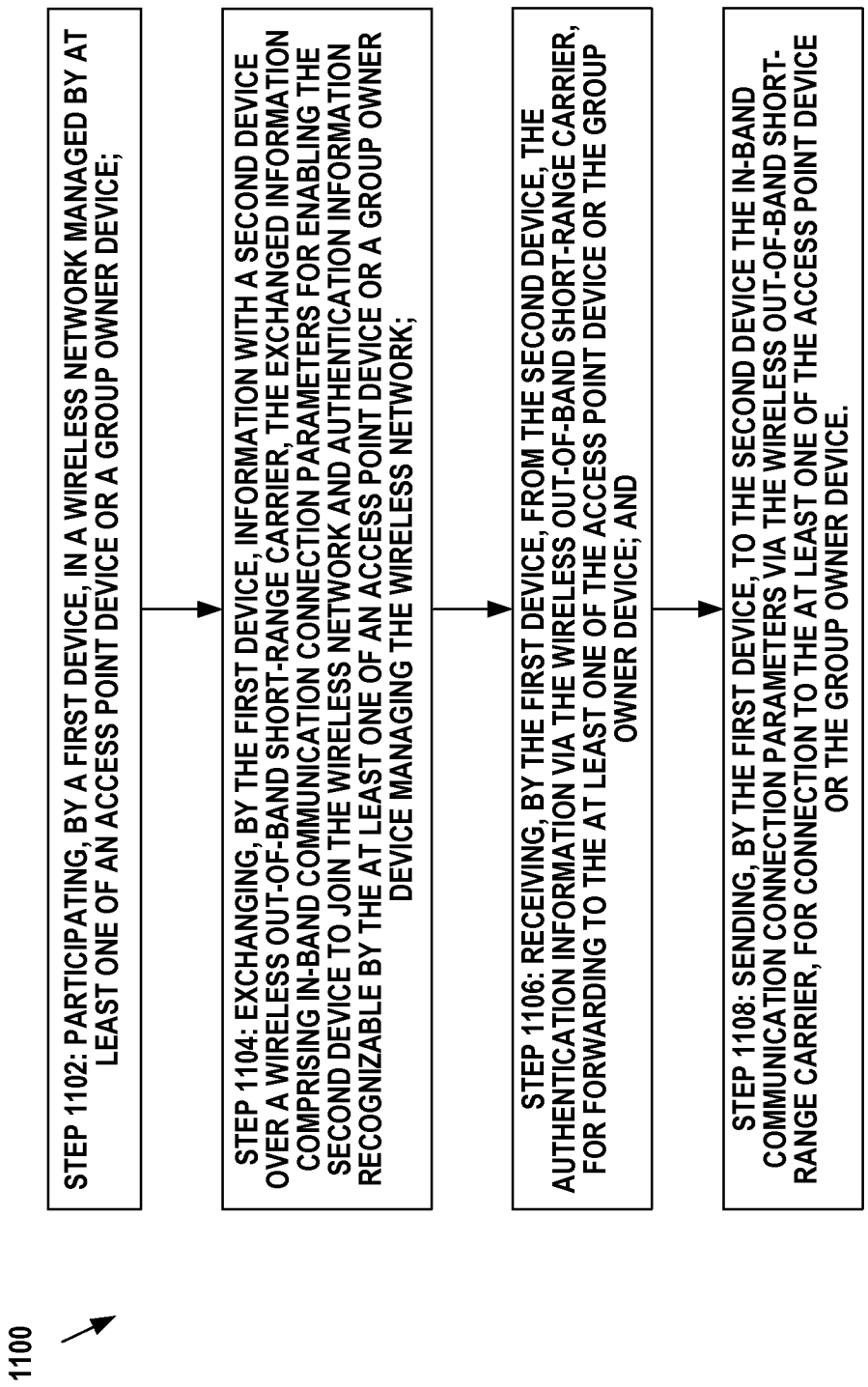
FIG. 11A is an example flow diagram of operational steps of an example embodiment of the method carried out by device A of FIG. 2 and FIGS. 8A-8H, according to an embodiment of the present invention.

FIG. 11A is an example flow diagram 1100 of example operational steps of an example embodiment of the method carried out between the two wireless devices of FIG. 2 and FIGS. 8A-8H, according to an embodiment of the present invention. The steps of the flow diagram represent computer code instructions stored in the RAM and/or ROM memory of the wireless device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 1102: participating, by a first device, in a wireless network managed by at least one of an access point device or a group owner device;

Step 1104: exchanging, by the first device, information with a second device over a wireless out-of-band short-range carrier, the exchanged information comprising in-band communication connection parameters for enabling the second device to join the wireless network and authentication information recognizable by the at least one of an access point device or a group owner device managing the wireless network;

Step 1106: receiving, by the first device, from the second device, the authentication information via the wireless out-of-band short-range carrier, for forwarding to the at least one of the access point device or the group owner device; and Step 1108: sending, by the first device, to the second device the in-band communication connection parameters via the wireless out-of-band short-range carrier, for connection to the at least one of the access point device or the group owner device.

Figure 11B:
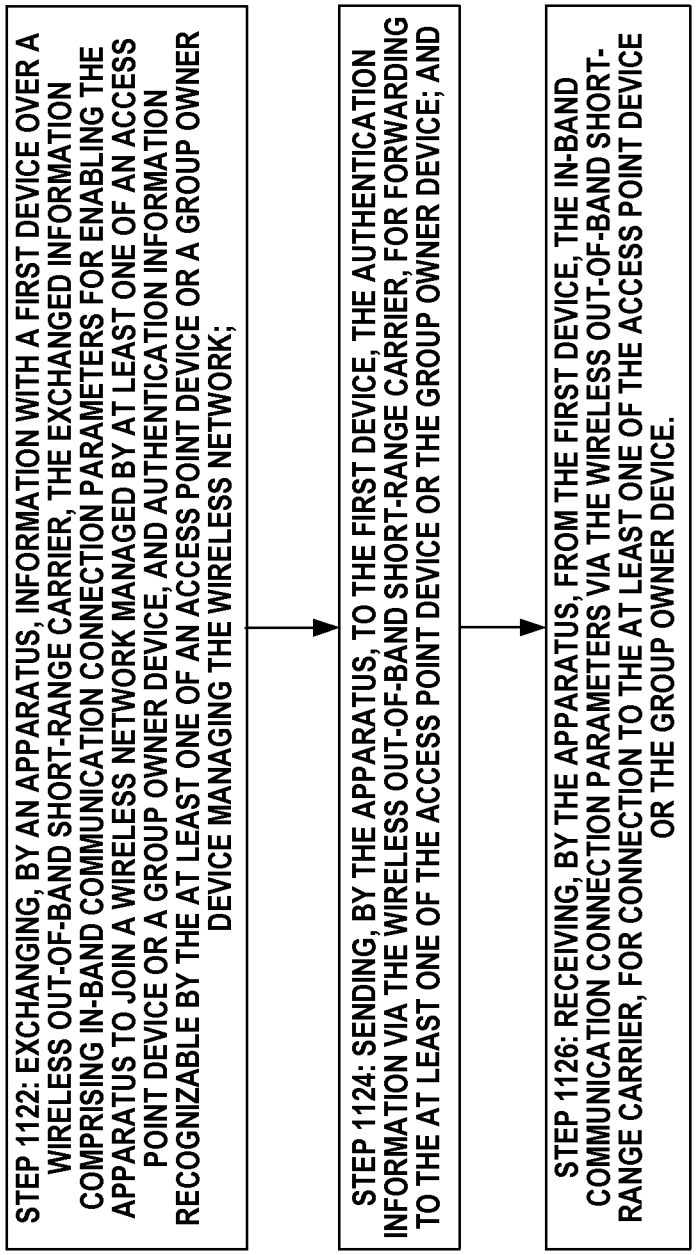
FIG. 11B is an example flow diagram of operational steps of an example embodiment of the method carried out by device B of FIG. 2 and FIGS. 8A-8H, according to an embodiment of the present invention.

FIG. 11B is an example flow diagram 1120 of example operational steps of an example embodiment of the method carried out between the two wireless devices of FIG. 2 and FIGS. 8A-8H, according to an embodiment of the present invention. The steps of the flow diagram represent computer code instructions stored in the RAM and/or ROM memory of the wireless device B, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 1122: exchanging, by an apparatus, information with a first device over a wireless out-of-band short-range carrier, the exchanged information comprising in-band communication connection parameters for enabling the apparatus to join a wireless network managed by at least one of an access point device or a group owner device, and authentication information recognizable by the at least one of an access point device or a group owner device managing the wireless network;

Step 1124: sending, by the apparatus, to the first device, the authentication information via the wireless out-of-band short-range carrier, for forwarding to the at least one of the access point device or the group owner device; and Step 1126: receiving, by the apparatus, from the first device, the in-band communication connection parameters via the wireless out-of-band short-range carrier, for connection to the at least one of the access point device or the group owner device.

FIG. 11C is an example flow diagram 1130 of example operational steps of an example embodiment of the method carried out between device A, device B and hub device AP/GO of FIG. 2 and FIG. 4 and FIGS. 8A-8H, according to an embodiment of the present invention. The steps of the flow diagram represent computer code instructions stored in the RAM and/or ROM memory of the hub device AP/GO, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 1132: receiving, by an apparatus, authentication information from a first wireless device via an in-band short-range carrier communication connection;

Step 1134: receiving, by the apparatus, the authentication information from the second wireless device via a second in-band short-range carrier communication connection; and Step 1136: granting, by the apparatus, access to the second device for joining a wireless network via the second in-band short-range carrier communication connection if the received authentication information from the second wireless device corresponds with the received authentication information from the first wireless device.

In an example embodiment, the an out-of-band short-range carrier transceiver in device A and device B may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, in ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

In example embodiments, the in-band short-range carrier transceiver in device A, device B, and the hub device AP/GO may be a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols include Bluetooth BR/EDR, Bluetooth Low Energy, Wireless USB (WUSB), Ultra Wide-band (UWB), ZigBee (IEEE 802.15.4, or IEEE 802.15.4a) for short range communication between devices. Local Area (WLAN) communications protocols include digital enhanced cordless telecommunications (DECT) and HIPERLAN. Wide Area (WAN) communications protocols include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   participating, by a first device, via a first in-band short-range carrier communication connection, in a wireless network managed by at least one of an access point device or a group owner device;
   exchanging, by the first device, information with a second device that is not connected to the wireless network, over a wireless out-of-band short-range carrier, the exchanging of information comprising:
   receiving, by the first device, from the second device, authentication information via the wireless out-of-band short-range carrier, for forwarding, via the first in-band short-range carrier communication connection of the wireless network, to the at least one of the access point device or the group owner device; and sending, by the first device, to the second device in-band communication connection parameters via the wireless out-of-band short-range carrier, for enabling establishing a second in-band short-range carrier communication connection of the second device to the wireless network managed by the at least one of the access point device or the group owner device; and transmitting, by the first device, the received authentication information, to the at least one of the access point device or the group owner device, via the first in-band short-range carrier communication connection, for enabling the access point device or the group owner device to grant access to the second device for joining the wireless network via the second in-band short-range carrier communication connection.

2. An apparatus, comprising:

at least one processor;

at least one memory including computer program code;

the at least one memory and the computer program code configured to, with the at least one processor, cause the apparatus at least to:

participate via a first in-band short-range carrier communication connection, in a wireless network managed by at least one of an access point device or a group owner device;

exchange information with a second device that is not connected to the wireless network, over a wireless out-of-band short-range carrier, the exchanging of information comprising:

receive from the second device, authentication information via the wireless out-of-band short-range carrier, for forwarding, via the first in-band short-range carrier communication connection of the wireless network, to the at least one of the access point device or the group owner device; and send to the second device in-band communication connection parameters via the wireless out-of-band short-range carrier, for enabling establishing a second in-band short-range carrier communication connection of the second device to the wireless network managed by the at least one of the access point device or the group owner device; and transmit the received authentication information, to the at least one of the access point device or the group owner device, via the first in-band short-range carrier communication connection, for enabling the access point device or the group owner device to grant access to the second device for joining the wireless network via the second in-band short-range carrier communication connection.

3. The apparatus of claim 2, wherein the wireless out-of-band short-range carrier is one of Near Field Communication, Radio Frequency Identification, Infrared Data Association, or Ultra Wide Band.

4. A computer program product comprising computer executable program code recorded on a computer readable non-transitory storage medium, the computer executable program code comprising:

code for participating, by a first device, via a first in-band short-range carrier communication connection, in a wireless network managed by at least one of an access point device or a group owner device;

code for exchanging, by the first device, information with a second device that is not connected to the wireless network, over a wireless out-of-band short-range carrier, the exchanging of information comprising:

code for receiving, by the first device, from the second device, authentication information via the wireless out-of-band short-range carrier, for forwarding, via the first in-band short-range carrier communication connection of the wireless network, to the at least one of the access point device or the group owner device; and code for sending, by the first device, to the second device in-band communication connection parameters via the wireless out-of-band short-range carrier, for enabling establishing a second in-band short-range carrier communication connection of the second device to the wireless network managed by the at least one of the access point device or the group owner device; and code for transmitting, by the first device, the received authentication information, to the at least one of the access point device or the group owner device, via the first in-band short-range carrier communication connection, for enabling the access point device or the group owner device to grant access to the second device for joining the wireless network via the second in-band short-range carrier communication connection.

5. A method, comprising:

exchanging, by a second device that is not connected to a wireless network, information with a first device, over a wireless out-of-band short-range carrier, the exchanged information comprising:

sending, by the second device to the first device, authentication information recognizable by at least one of an access point device or a group owner device managing the wireless network, for forwarding by the first device, via a first in-band short-range carrier communication connection of the wireless network, to the at least one of the access point device or the group owner device; and receiving, by the second device in-band communication connection parameters via the wireless out-of-band short-range carrier, for enabling establishing a second in-band short-range carrier communication connection of the second device to the wireless network managed by the at least one of the access point device or the group owner device; and transmitting, by the second device, the authentication information to the at least one of the access point device or the group owner device via an in-band communication connection to enable the second device to join the wireless network, according to the in-band communication connection parameters.

6. An apparatus, comprising:

at least one processor;

at least one memory including computer program code;

the at least one memory and the computer program code configured to, with the at least one processor, cause the apparatus at least to:

exchange by the apparatus that is not connected to a wireless network, information with a first device, over a wireless out-of-band short-range carrier, the exchanged information comprising:

send to the first device, authentication information recognizable by at least one of an access point device or a group owner device managing the wireless network, for forwarding by the first device, via a first in-band short-range carrier communication connection of the wireless network, to the at least one of the access point device or the group owner device; and receive in-band communication connection parameters via the wireless out-of-band short-range carrier, for enabling establishing a second in-band short-range carrier communication connection of the second device to the wireless network managed by the at least one of the access point device or the group owner device; and transmit the authentication information to the at least one of the access point device or the group owner device via an in-band communication connection to enable the apparatus to join the wireless network, according to the in-band communication connection parameters.

7. The apparatus of claim 6, wherein the wireless out-of-band short-range carrier is one of Radio Frequency Identification, Near Field Communication, Infrared Data Association, or Ultra Wide Band.

8. A computer program product comprising computer executable program code recorded on a computer readable non-transitory storage medium, the computer executable program code comprising:

code for exchanging, by a second device that is not connected to a wireless network, information with a first device, over a wireless out-of-band short-range carrier, the code for exchanging information comprising:

code for sending, by the second device to the first device, authentication information recognizable by at least one of an access point device or a group owner device managing the wireless network, for forwarding by the first device, via a first in-band short-range carrier communication connection of the wireless network, to the at least one of the access point device or the group owner device; and code for receiving, by the second device in-band communication connection parameters via the wireless out-of-band short-range carrier, for enabling establishing a second in-band short-range carrier communication connection of the second device to the wireless network managed by the at least one of the access point device or the group owner device; and code for transmitting, by the second device, the authentication information to the at least one of the access point device or the group owner device via an in-band communication connection to enable the second device to join the wireless network, according to the in-band communication connection parameters.

9. The method of claim 1, wherein the wireless out-of-band short-range carrier comprises one of Near Field Communication or Radio Frequency Identification carrier.

10. The method of claim 1, wherein the in-band communication connection comprises one of Wireless Local Area Network (WLAN), or Bluetooth connection.

11. The apparatus of claim 2, wherein the in-band communication connection comprises one of Wireless Local Area Network (WLAN), or Bluetooth connection.

12. The computer program product of claim 4, wherein the wireless out-of-band short-range carrier comprises one of Near Field Communication or Radio Frequency Identification carrier.

13. The computer program product of claim 4, wherein the in-band communication connection comprises one of Wireless Local Area Network (WLAN), or Bluetooth connection.

14. The method of claim 5, wherein the wireless out-of-band short-range carrier comprises one of Near Field Communication or Radio Frequency Identification carrier.

15. The method of claim 5, wherein the in-band communication connection comprises one of Wireless Local Area Network (WLAN), or Bluetooth connection.

16. The apparatus of claim 6, wherein the in-band communication connection comprises one of Wireless Local Area Network (WLAN), or Bluetooth connection.

17. The computer program product of claim 8, wherein the wireless out-of-band short-range carrier comprises one of Near Field Communication or Radio Frequency Identification carrier.

18. The computer program product of claim 8, wherein the in-band communication connection comprises one of Wireless Local Area Network (WLAN), or Bluetooth connection.

* * * * *